United States Patent [19]

McDermott et al.

[11] Patent Number: 5,543,439

[45] Date of Patent: Aug. 6, 1996

[54] EXTRUDED FRAGRANCE-CONTAINING POLYVINYL ALCOHOL AND USE THEREOF

[75] Inventors: Keith J. McDermott, Bound Brook; John M. Teffenhart, Edison; Shmuel D. Shefer, East Brunswick; David A. Greene, Wanamassa; Leslie C. Smith, Jamesburg; Charles E. J. Beck, Summit, all of N.J.

[73] Assignee: International Flavors & Fragrances Inc., New York, N.Y.

[21] Appl. No.: 394,614

[22] Filed: Feb. 24, 1995

Related U.S. Application Data

[63] Continuation-in-part of Ser. No. 253,243, Jun. 2, 1994.

[51] Int. Cl.$^6$ ................... A61L 9/01; E03D 9/02
[52] U.S. Cl. ................ 523/102; 523/205; 523/210; 424/76.7; 4/222; 510/101; 510/193
[58] Field of Search ................ 523/102, 205, 523/210; 424/76.7; 4/222; 252/174.11, 174.23, DIG. 2, DIG. 6, DIG. 16

[56] References Cited

U.S. PATENT DOCUMENTS

| | | | |
|---|---|---|---|
| 3,688,985 | 9/1972 | Engel | 239/54 |
| 3,725,311 | 4/1973 | Grubb | 252/522 |
| 4,229,410 | 10/1980 | Kosti | 422/28 |
| 4,339,356 | 7/1982 | Whyte | 252/522 A |
| 4,452,713 | 6/1984 | Small | 252/99 |
| 4,460,490 | 7/1984 | Barford et al. | 252/92 |
| 4,522,738 | 6/1985 | Magid et al. | 252/90 |
| 4,552,693 | 11/1985 | Hussain et al. | 252/522 A |
| 4,618,648 | 10/1986 | Marten | 525/60 |
| 4,722,802 | 2/1988 | Hutchings et al. | 252/174 |
| 4,803,195 | 2/1989 | Holzner | 512/4 |

(List continued on next page.)

FOREIGN PATENT DOCUMENTS

| | | |
|---|---|---|
| 2104728 | 2/1994 | Canada. |
| 380103 | 1/1990 | European Pat. Off.. |
| 583512 | 8/1992 | European Pat. Off.. |
| 0635545 | 1/1995 | European Pat. Off.. |

OTHER PUBLICATIONS

JP 54–63148, pub. date May 21, 1979; with English language translation.

L'Oreal SA, Abstract of Published Japanese Application No. J94/010128 (Derwent Accession No. 87–323086/46).

*Primary Examiner*—Patrick Ryan
*Assistant Examiner*—Marie R. Yamnitzky
*Attorney, Agent, or Firm*—Arthur L. Liberman

[57] ABSTRACT

Described is a composition of matter particularly useful in fabricating toilet rim blocks consisting of:

(a) extruded polyvinyl alcohol or partially hydrolyzed polyvinyl acetate with the maximum mole ratio of acetyl moiety:hydroxyl moiety being about 3:1 having a number average molecular weight of from about 15,000 up to about 68,000 containing 0 up to about 13% by weight of plasticizer;

(b) from about 1 up to about 20% by weight of a compatible fragrance contained within the polyvinyl alcohol or partially hydrolyzed polyvinyl acetate;

(c) from 0 up to about 20% by weight of a "foaming agent" which is a first surfactant and which can be a detergent, contained within the polyvinyl alcohol or partially hydrolyzed polyvinyl acetate;

(d) from 0 up to about 20% by weight of a hydrophobic silica contained within the polyvinyl alcohol or partially hydrolyzed polyvinyl acetate;

(e) from 0 up to about 20% by weight of at least one second surfactant in addition to the "foaming agent";

(f) from 0 up to about 5% by weight of a water soluble dye; and (g) from 0 up to about 4% by weight of a "foam booster".

Also described are processes for preparing such compositions of matter and such toilet rim blocks. When used for the fabrication of toilet rim blocks, the maximum mole ratio of acetyl moiety:hydroxyl moiety is about 1:3.

8 Claims, 26 Drawing Sheets

U.S. PATENT DOCUMENTS

| | | | |
|---|---|---|---|
| 4,820,449 | 4/1989 | Menke et al. | 252/544 |
| 4,842,761 | 6/1989 | Rutherford | 252/90 |
| 4,861,511 | 8/1989 | Kaplan | 252/174.23 |
| 4,911,858 | 3/1990 | Bunczk et al. | 252/106 |
| 5,051,222 | 9/1991 | Marten et al. | 264/143 |
| 5,116,627 | 5/1992 | Rutherford et al. | 426/5 |
| 5,350,630 | 9/1994 | Schreiner et al. | 428/343 |

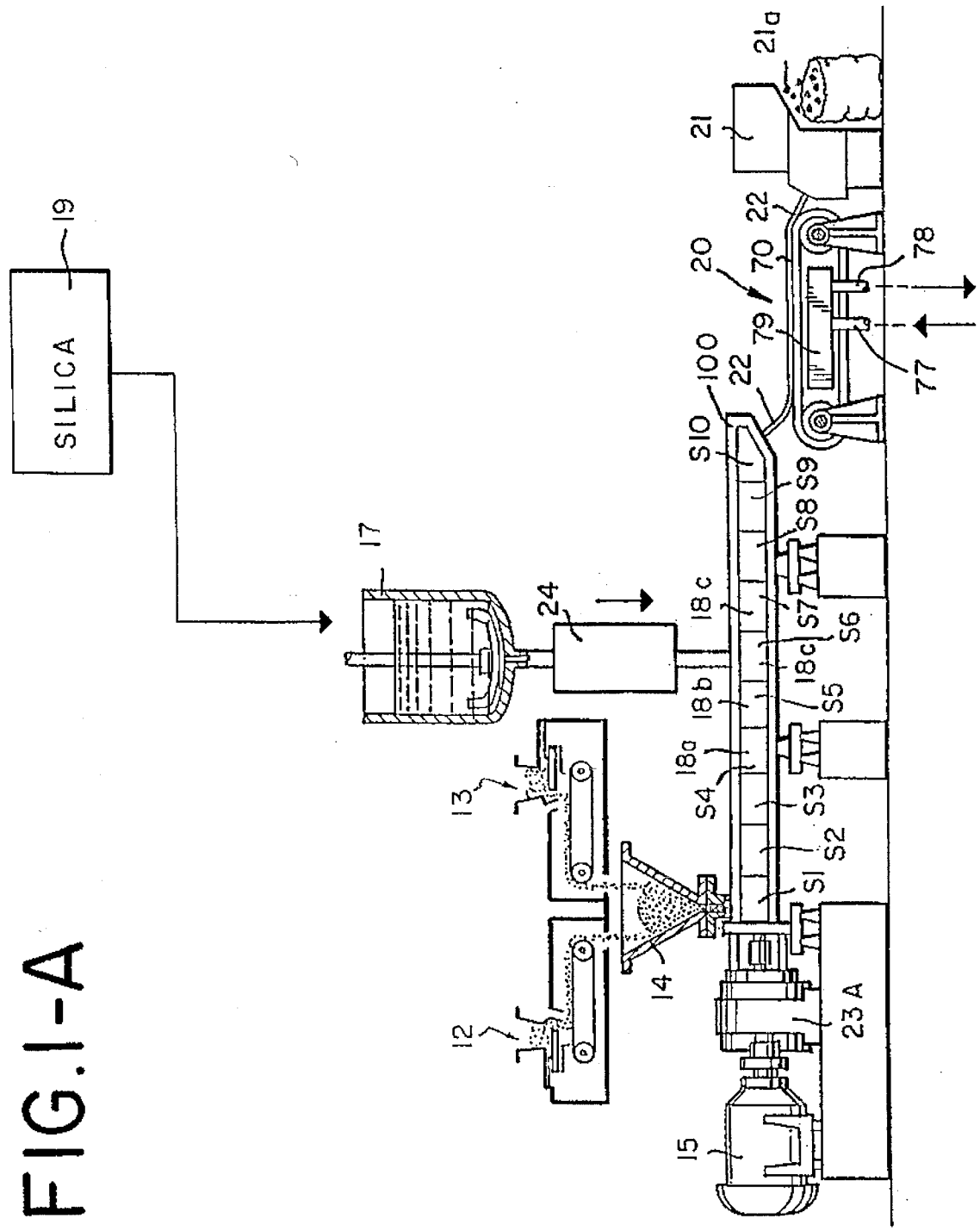
FIG.1-A

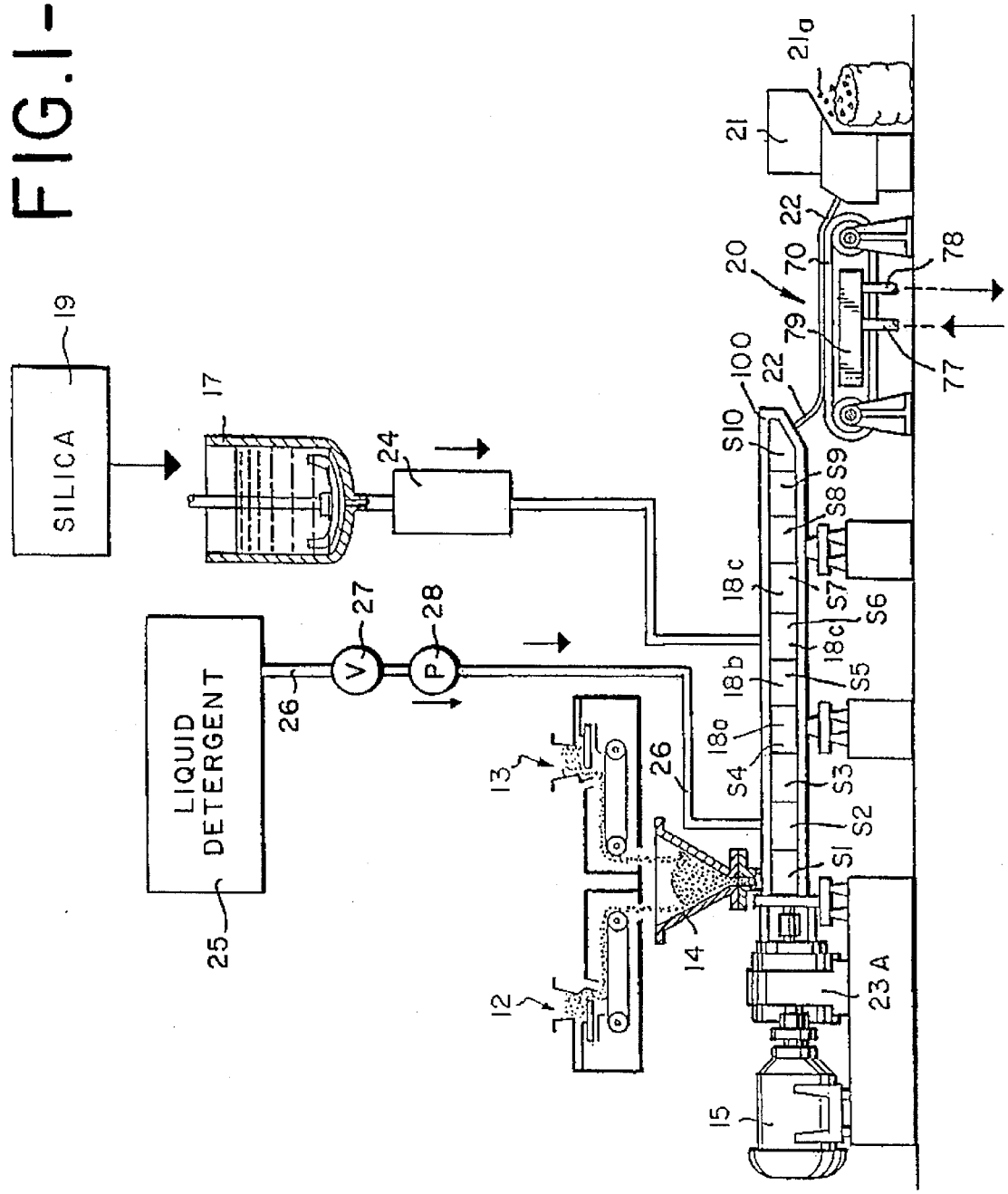

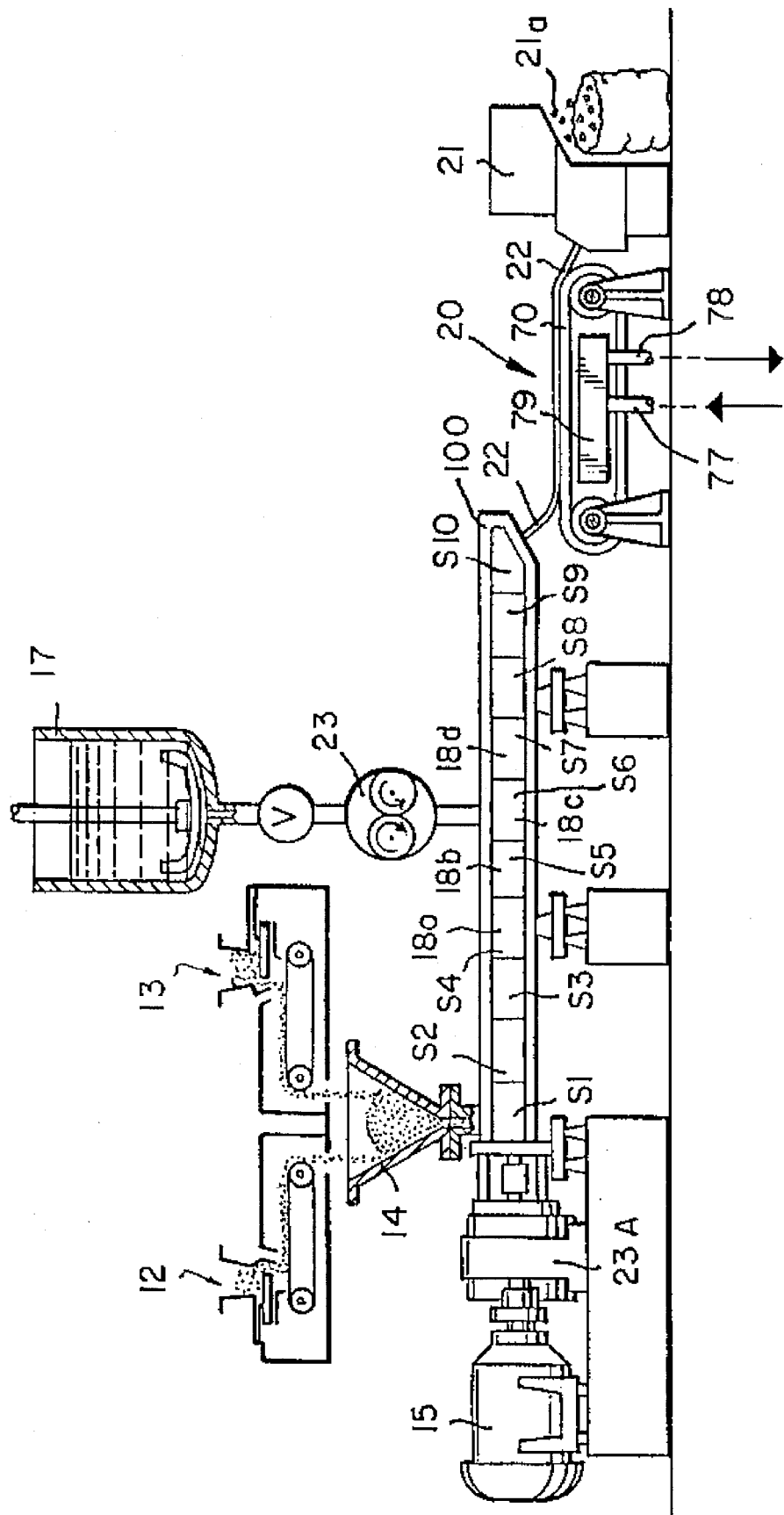
FIG. 2-A

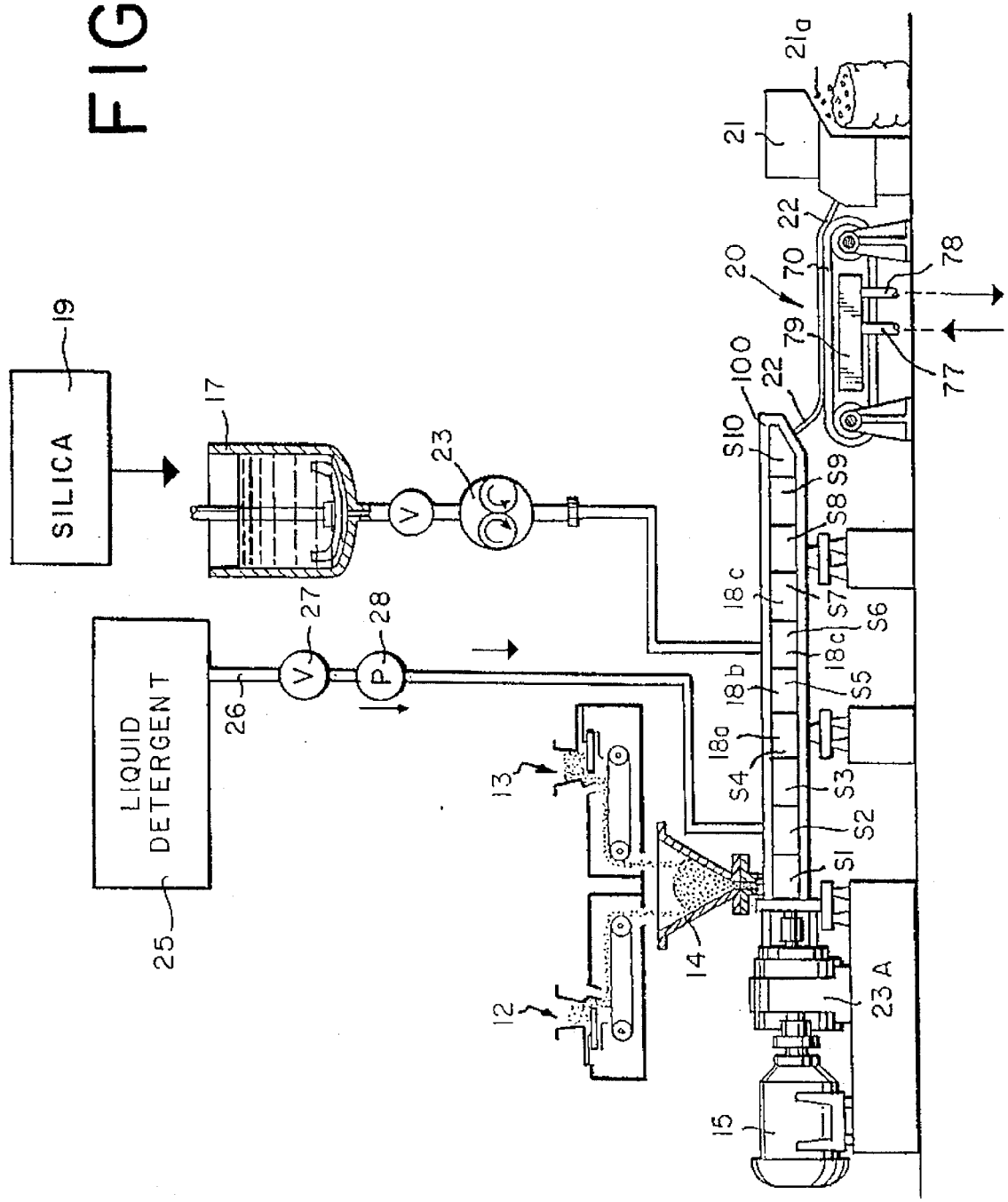

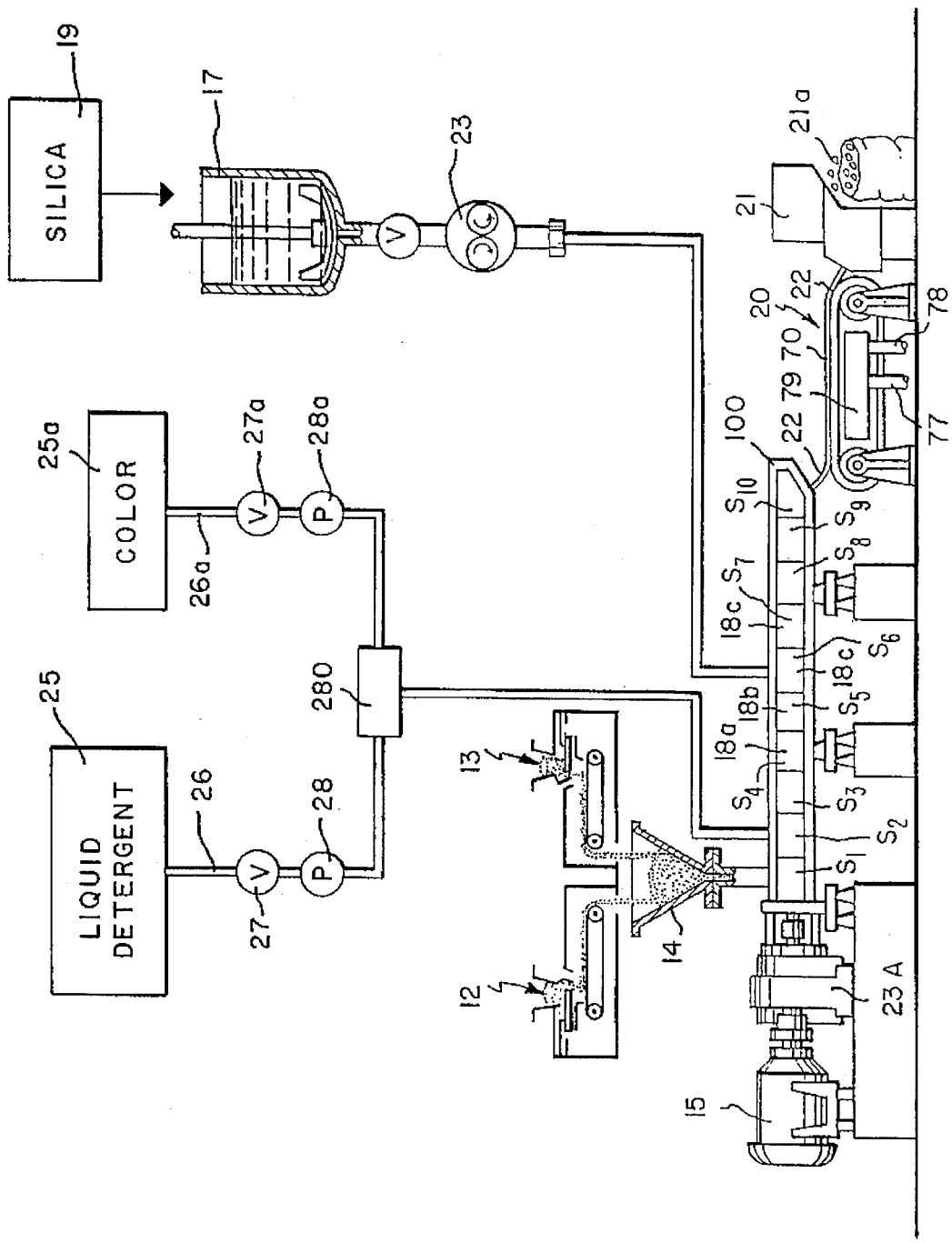

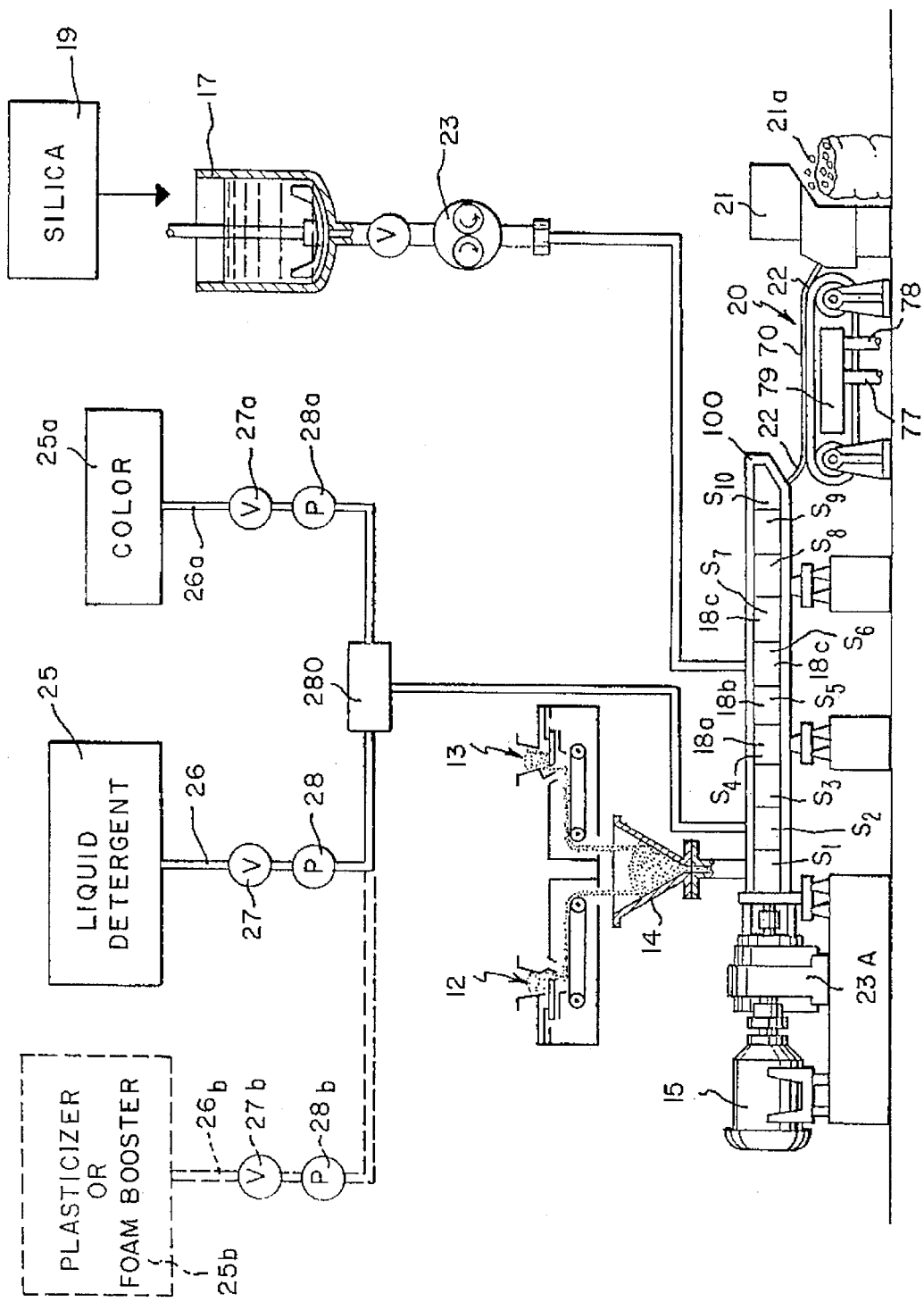
FIG. 2-D

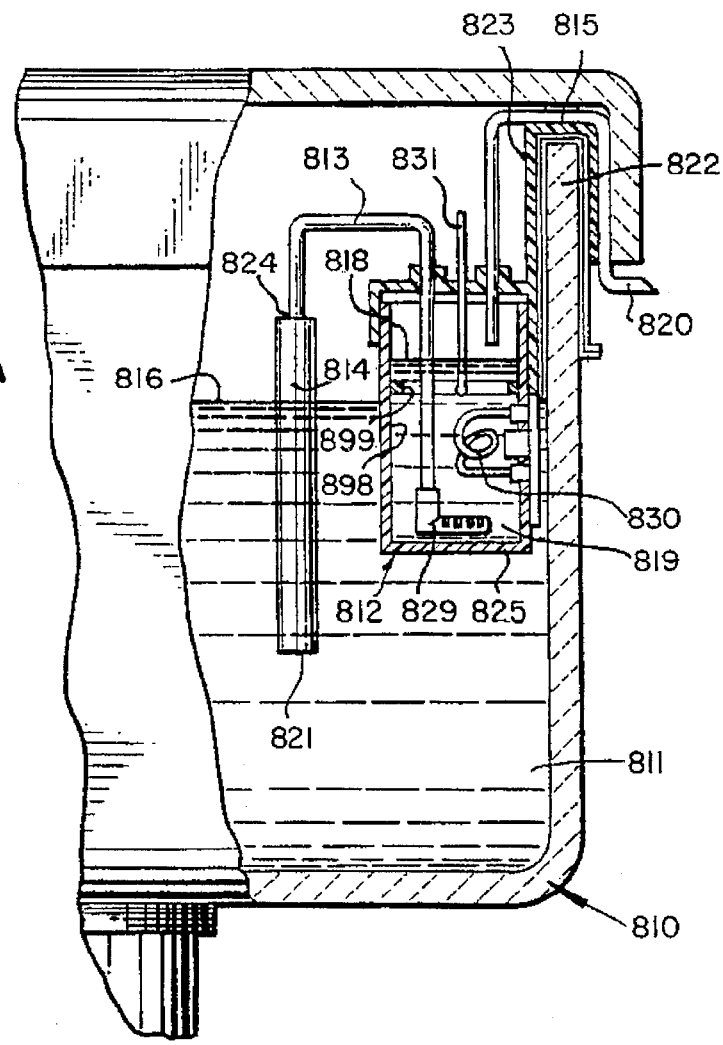
FIG.8-A
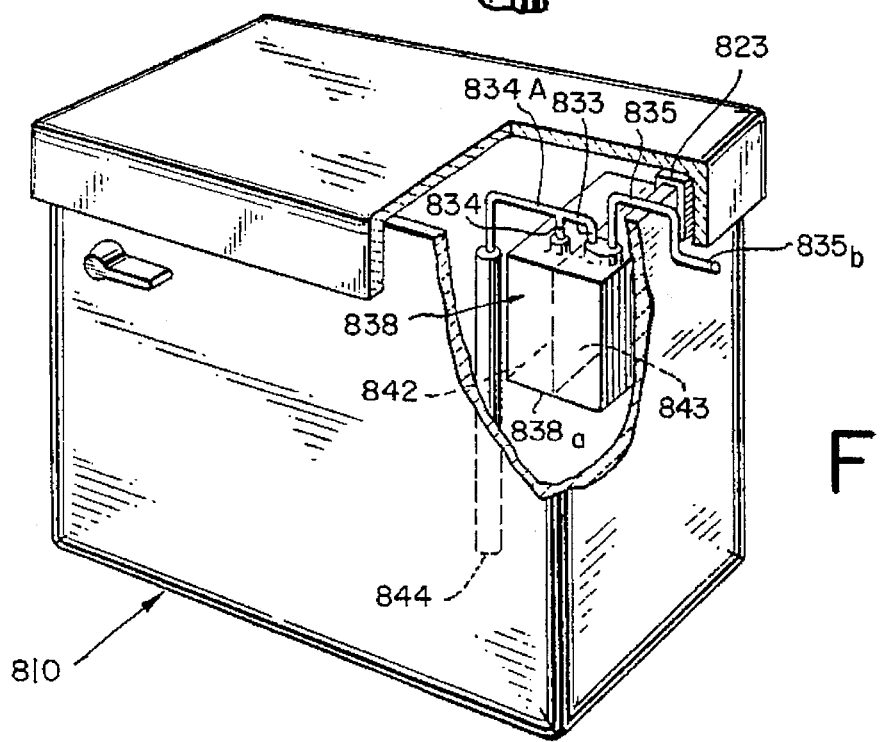
FIG.8-B

FIG.10-A
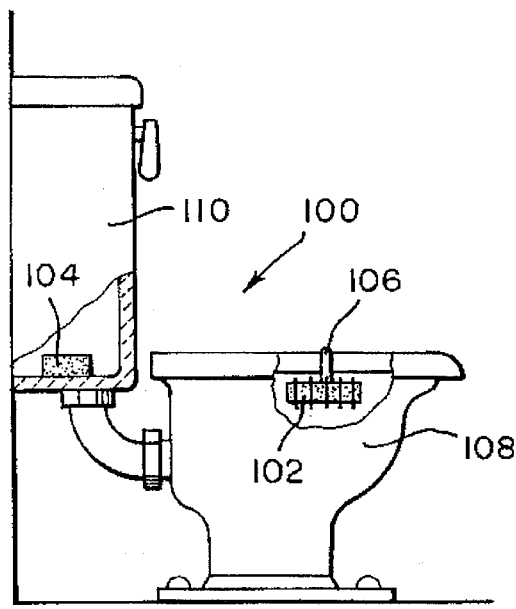
FIG.10-C
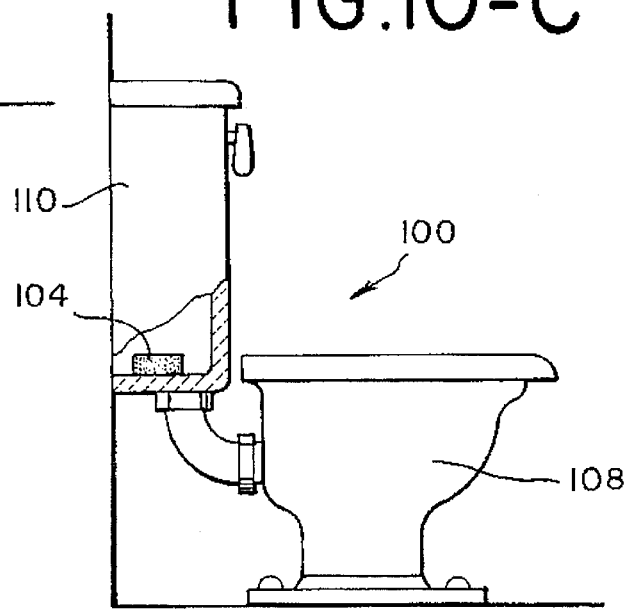
FIG.10-B
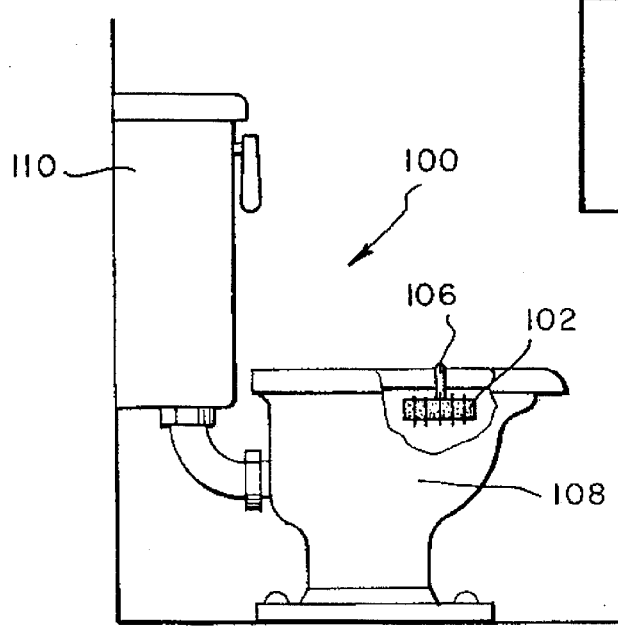

EXTRUDED FRAGRANCE-CONTAINING POLYVINYL ALCOHOL AND USE THEREOF

RELATED CO-PENDING PATENT APPLICATIONS

This application is a Continuation-in-Part of Application for U.S. patent Ser. No. 08/253,243 filed on Jun. 2, 1994.

BACKGROUND OF THE INVENTION

Our invention relates to water-soluble polyvinyl alcohol or partially hydrolyzed polyvinyl acetate having admixed therewith compatible fragrances particularly for use in fabrication of toilet rim blocks.

Accordingly, a need exists for a high compatible fragrance loading of polyvinyl alcohol or partially hydrolyzed polyvinyl acetate whereby an effective air freshening device can be fabricated in a commercially feasible manner.

U.S. Pat. No. 4,911,858 issued on Mar. 27, 1990 discloses solid cake lavatory cleansing block composition comprising polyethylene glycol polymer and guar gum, and optional ingredients which include fragrances, dyes, solid binders, filler material and mixtures thereof.

U.S. Pat. No. 4,820,449 issued on Apr. 11, 1989 discloses a cleaning block for the tank of flush toilets comprising: 10 to 30% by weight of monoalkyl sulfate, sodium salt, 5 to 40% by weight of fatty acid alkanolamide, and 15 to 60% by weight of a water-soluble inorganic alkali salt, and optionally calcium-complexing carboxylic acids or alkali salts thereof, perfume, dye and other auxiliaries.

U.S. Pat. No. 4,722,802 issued on Feb. 2, 1988 discloses a surfactant cleansing block suitable for placement in a toilet tank or other water-containing reservoir, comprising a hydrated cellulosic binder and a surfactant, and processes for making same, especially by extrusion of a homogeneous blend of said blender and said surfactant.

Toilet rim blocks, however, have never been fabricated using polyvinyl alcohol or partially hydrolyzed polyvinyl acetate with the advantage obtained when using such polymers.

Extruded polyvinyl alcohol when used with other polymers is shown to be useful, for example, in chewing gum containing compositions for control release of flavor bearing substances in U.S. Pat. No. 5,116,627 issued on May 26, 1992.

U.S. Pat. No. 5,116,627 issued on May 26, 1992 describes a chewing gum comprising a chewing gum base having dispersed therein, separately, a multiplicity of sweetener bearing polymeric particles and/or flavor-bearing polymeric particles, said polymeric particles further comprising:

(a) at least one water-soluble normally solid polymer (for example, polyvinyl alcohol, extruded);

(b) at least one water-insoluble normally solid polymer;

(c) and either:
  (i) at least one flavor composition a substantial portion of which is incorporated in the water-insoluble polymer and a substantially portion of which is incorporated in the water-soluble polymer; and/or
  (ii) at least one sweetener composition a substantial portion of which is incorporated in the water-insoluble polymer and a substantial portion of which is incorporated in the water-soluble polymer;

the water-soluble polymer and the water-insoluble polymer being physically associated with each other associated in such a manner that one is in the form of a multiplicity of discrete entities in a matrix of the other.

Holzner, U.S. Pat. No. 4,803,195 issued on Feb. 7, 1989 describes a personal care composition having deodorant or antiperspirant activity and containing, in addition to an active deodorant or perspirant base, a perfuming base, either in the form of an aqueous emulsion, or in micro-encapsulated form. the perfume base is combined with a film-forming substrate such as polyvinyl alcohol and an emulsifying agent. It is stated in U.S. Pat. No. 4,803,195 that the composition of the invention has the advantage of releasing the volatile constituents of the perfume at the appropriate moment by the action of a source of moisture, in particular, sweat.

Hussain and Zukoski in U.S. Pat. No. 4,552,693 issued on Nov. 12, 1985 describes transparent fragrance-emitting articles, formed from a composition which has a relatively low set point and comprises a thermoplastic polyamide resin plasticizer system. The plasticizer system comprises a sulfonamide and mineral oil which have been titrated to clarity with a solvent for both the oil and sulfonamide. U.S. Pat. No. 4,552,693 does not, however, contemplate water-soluble thermoplastic polymers such as polyvinyl alcohol in the absence of other organic polymers but in the presence of a plasticizer.

Whyte, U.S. Pat. No. 4,339,356 issued on Jul. 13, 1982 describes heavily perfumed detergent compositions having both immediate and long lasting perfume emitting properties prepared by a process in which perfume is emulsified in a water solution of a water-soluble polymer such as polyvinyl alcohol and the emulsion is mixed with a powdered hydratable material in such a ratio that all of the water in the emulsion can be bound in the resulting hydrate eliminating a separate drying step. In U.S. Pat. No. 4,339,356, the result is a dry free flowing granular material which can be readily dry mixed into fully formulated detergent compositions. It is further indicated that the perfume is retained in the polymeric matrix and is released at the point of product use when contacted with water. U.S. Pat. No. 4,339,356 does not contemplate, however, a toilet rim block containing extruded polyvinyl alcohol and a relatively high loading of fragrance.

Rutherford, U.S. Pat. No. 4,842,761 issued on Jun. 27, 1989 discloses laundering compositions containing particulate olfactory polymers which provide for the controlled release of olfactory compositions such as perfumes, where the particulate olfactory polymers comprising a water-soluble normally solid polymer (for example, polyvinyl alcohol), a water-insoluble normally polymer, and at least one olfactory composition which is in each polymer, one polymer being in the form of discrete entities in a matrix of the other polymer, together with laundering articles such as packets containing such compositions. It is indicated by Rutherford that the composition can be formed by means of extrusion (attention is drawn to FIG. 2E) but the extrusion involves extrusion of both the water-soluble and water-insoluble polymers simultaneously. Reference is specifically made to column 11, lines 11–36 of U.S. Pat. No. 4,842,761.

Marten, U.S. Pat. No. 5,051,222 issued on Sep. 24, 1991 discloses methods for producing the polyvinyl alcohol and partially hydrolyzed polyvinyl acetate useful in our invention. Marten, et al, U.S. Pat. No. 5,051,222 discloses a method for extruding polyvinyl alcohol which includes:

(a) adding sufficient energy to the polyvinyl alcohol to both melted and essentially eliminate the crystallinity in the melt; and (b) simultaneously removing energy from the melt at a rate sufficient to avoid decomposition of the polyvinyl alcohol and rapidly cooling the extruded melt, reducing the heat history and improving the resulting color of the extrudable polyvinyl alcohol. U.S. Pat. No. 5,051,222 is incorporated herein by reference. U.S. Pat. No. 5,051,222 discloses the creation of polyvinyl alcohol and partially hydrolyzed polyvinyl acetate wherein the maximum mole ratio of acetyl-hydroxyl moieties is about 1:4 having a number average molecular weight of from about 15,000 up to about 68,000 and containing a plasticizer. Of specific interest is Example I at column 10, lines 7–60 of U.S. Pat. No. 5,051,222.

Grubb, U.S. Pat. No. 3,725,311 issued on Apr. 3, 1973 discloses an extrudable composition and process for producing it comprising a polymer of 80 to 90% polyvinyl chloride, 2 to 20% polyvinyl acetate and 0 to 20% polyvinyl alcohol, a plasticizer, a filler to maintain a dry mixture and a volatile odor-neutralizing or modifying agent (such as a perfume). The Grubb reference U.S. Pat. No. 3,725,311 states that the composition is extrudable at a temperature of below 250° F. in order to avoid loss of the volatile odor-neutralizing agent through degradation or evaporation. The Grubb copolymer is not, however, water soluble and cannot properly be used in a toilet rim block as in the case of the above-identified Application.

Procter & Gamble, European Published Patent Application No. 583,512 filed on Aug. 18, 1992 discloses a detergent additive comprising a mixture of (a) a water-soluble or water-dispersible detergent active compound and (b) a surfactant absorbed into (c) a porous hydrophobic material which is coated with (d) a hydrophobic coating material. The porous hydrophobic material can be, for example, silica. The polymeric material may be, for example, polyvinyl alcohol. Water-soluble toilet rim blocks, however, made from polyvinyl alcohol or partially hydrolyzed polyvinyl acetate having a number average molecular weight of from about 15,000 up to about 68,000 are not contemplated by the Procter & Gamble European Application.

Published European Application No. 380,103 (Dow Corning) filed on Jan. 25, 1990 discloses a polyvinyl alcohol hydrogel dispenser for controlled release of fragrances and the like. Extruded polyvinyl alcohol or partially hydrolyzed polyvinyl acetate containing a high loading of fragrance for use in fabricating toilet rim blocks is not, however, contemplated by the Dow Corning Published European Application.

L'Oreal Japanese Published Application No. J94/010,128 (corresponding to U.K. Patent Specification No. 2,190,393 filed on Sep. 2, 1994) discloses the use of partially acetylated polyvinyl alcohol as a foaming agent in an aqueous aerosol foam composition for treating skin or hair. Foaming agents in combination with polyvinyl alcohol or partially hydrolyzed polyvinyl acetate for use in fabricating toilet rim blocks are now, however, contemplated by the L'Oreal disclosure.

In summary, nothing in the prior art contemplates the composition of matter or the process for producing same or the toilet rim block of our invention.

THE INVENTION

Our invention is directed to a composition of matter consisting of:

(a) extruded polyvinyl alcohol or partially hydrolyzed polyvinyl acetate with the maximum mole ratio of the acetyl moiety:hydroxyl moiety being about 3:1, having a number average molecular weight of from about 15,000 up to about 68,000 containing from 0 up to about 13% by weight of a polar plasticizer;

(b) from about 1 up to about 20% by weight of a compatible fragrance contained within the polyvinyl alcohol or the partially hydrolyzed polyvinyl acetate;

(c) from 0 up to about 20% by weight of a "foaming agent" which is a first surfactant and which can be a detergent, contained within the polyvinyl alcohol or partially hydrolyzed polyvinyl acetate;

(d) from 0 up to about 20% by weight of hydrophobic silica contained within the polyvinyl alcohol or the partially hydrolyzed polyvinyl acetate;

(e) from 0 up to about 20% by weight of at least one second surfactant in addition to the aforementioned "foaming agent" of (c);

(f) from 0 up to about 5% of a water-soluble dye; and (g) from 0 up to about 4% of a "foam booster".

Our invention also contemplates toilet rim blocks fabricated from such compositions of matter wherein the maximum mole ratio of acetyl moiety:hydroxyl moiety is about 1:3. It should be noted that partially hydrolyzed polyvinyl acetate having a mole ratio of acetyl moiety:hydroxyl moiety in the range of from 3:1 up to 1:3 is useful in toilet rim blocks, but the majority of the toilet rim block must be fabricated from either extruded polyvinyl alcohol or partially hydrolyzed polyvinyl acetate with the maximum mole ratio of acetyl moiety:hydroxyl moiety being about 3:1. Partially hydrolyzed polyvinyl acetate with a range of mole ratios of acetyl moiety:hydroxyl moiety between about 3:1 and about 1:3 are water-swellable; not water-soluble whereas partially hydrolyzed polyvinyl acetate with a maximum mole ratio of acetyl moiety:hydroxyl moiety of about 1:3 are water-soluble at ambient temperatures, e.g., 25°–35° C.

Our invention also contemplates a process for preparing the aforementioned composition of matter as well as the toilet rim blocks.

In practicing our invention, the polyvinyl alcohol or partially hydrolyzed polyvinyl acetate is prepared by means of any of Examples I—XIV of U.S. Pat. No. 5,051,222 issued on Sep. 24, 1991, the specification for which is incorporated herein by reference. Thus, the polyvinyl alcohol or the partially hydrolyzed polyvinyl acetate is prepared first by polymerizing (via a "free radical" polymerization mechanism) vinyl acetate having the formula:

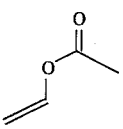

according to the reaction:

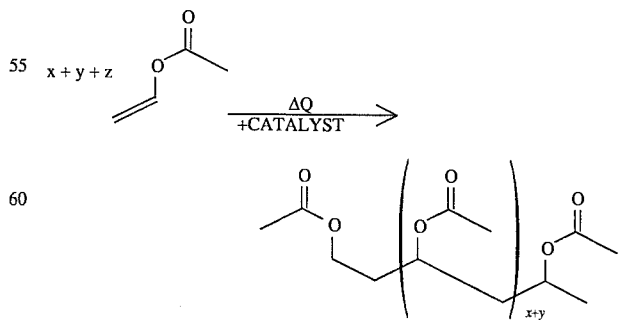

thereby forming a polyvinyl acetate wherein x+y are such that the number average molecular weight of the final product is between 15,000 and 68,000. The resulting polyvinyl acetate having the formula:

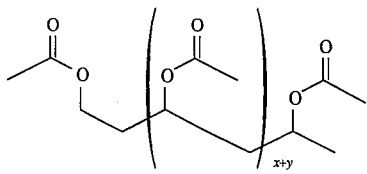

is then hydrolyzed first to form a partially hydrolyzed polyvinyl alcohol according to the reaction;

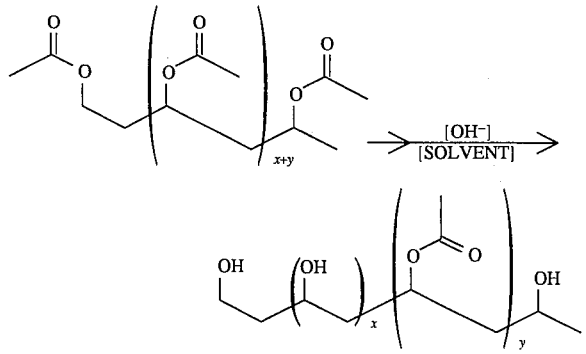

or a mixture of polyvinyl alcohol and partially hydrolyzed polyvinyl acetate according to the reaction:

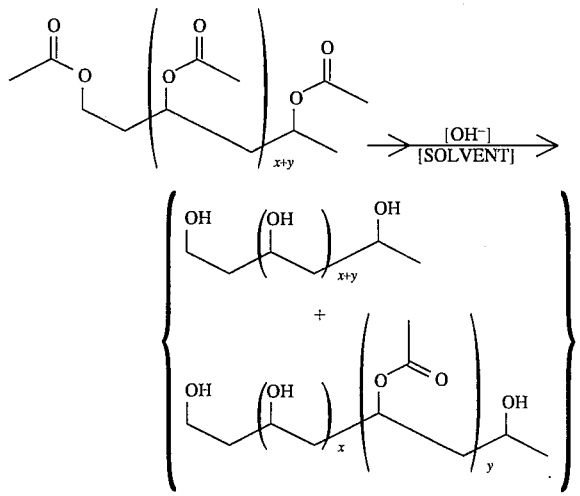

If desired, the partially hydrolyzed polyvinyl acetate may be further hydrolyzed to form polyvinyl alcohol without any acetyl groups present according to the reaction:

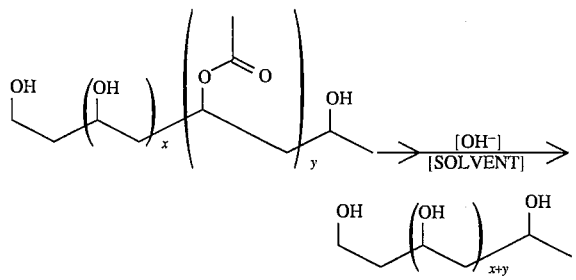

In any event, the ratio of acetyl moieties to hydroxyl moieties is less than about 3:1 in the structure:

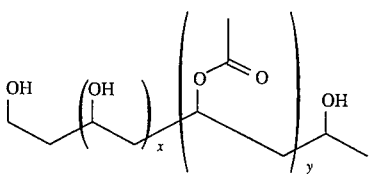

and x and y are defined whereby x+y gives rise to a polymer that has a number average molecular weight of between about 15,000 and 68,000.

The amount of plasticizer contained in the resulting polyvinyl alcohol or partially hydrolyzed polyvinyl acetate may vary from about 0 up to 13% by weight of the polyvinyl alcohol or partially hydrolyzed polyvinyl acetate. This presupposes that the polyvinyl alcohol or partially hydrolyzed polyvinyl acetate commercially available already contains approximately 2% by weight plasticizer.

The plasticizer is a polar plasticizer having a solubility parameter, $\delta_t$ greater than about 20 MPa$^{1/2}$ (megapascals$^{1/2}$) (the square root of cohesive energy density) on the Hildebrand parameter scale (Reference: CRC Handbook of Solubility Parameters and Other Cohesion Parameters; Allen F. M. Barton; published 1983 by the CRC Press, Inc. of Boca Raton, Fla.). The solubility parameter, $\delta_t$ is in fact the root mean square sum of the three parameters: $\delta_D$, $\delta_P$, $\delta_H$ according to the equation:

$$\delta_t = \sqrt{\delta_D^2 + \delta_P^2 + \delta_H^2}$$

wherein the parameter $\delta_D$ is a measure of the Van der Waal's forces; $\delta_P$ is a measure of the polar forces and $\delta_H$ is a measure of the hydrogen bonding effect. Examples of such polar plasticizers are:

glycerine;

triethanolamine;

ethylene glycol;

propylene glycol;

diethylene glycol;

dipropylene glycol;

diethanolamine; and methyldiethylamine.

As stated above from about 1 up to about 20% by weight of a compatible fragrance may be contained within the polyvinyl alcohol or the partially hydrolyzed polyvinyl acetate. The compatible fragrance is added to the extruder at a point downstream from the addition of the polyvinyl alcohol or partially hydrolyzed polyvinyl acetate which is premixed with plasticizer or already contains plasticizer therein.

When from about 1% up to about 10% by weight of the composition of compatible fragrance is added to the extruder, it is not necessary to add to the compatible fragrance hydrophobic silica. When the amount of compatible fragrance is from about 5 up to about 10% by weight of the composition, it is preferred, however, to add hydrophobic silica to the compatible fragrance prior to feeding the mixture thereof to the extruder. When, however, the amount of compatible fragrance desired to be in the polyvinyl alcohol or partially hydrolyzed polyvinyl acetate is from 10% up to about 20% by weight of the composition of compatible fragrance, then within the definition of our invention, it is necessary to add hydrophobic silica to the perfume composition. The weight ratio of hydrophobic silica:compatible fragrance when the compatible fragrance is present in an amount of from about 10 up to about 20% is from about 1:1 silica:compatible fragrance up to about 1:2 silica:compatible fragrance.

An example of hydrophobic silica useful in the practice of our invention is SIPERNAT® D17 silica.

The polyvinyl alcohol or the partially hydrolyzed polyvinyl acetate may be premixed with other additives in addition to the plasticizers, for example, color additives, for example, Acid Blue No. 19 manufactured by Sandoz Pharmaceutical Corporation of Hanover, N.J.

Examples of the polyvinyl alcohol and partially hydrolyzed polyvinyl acetate useful in the practice of our invention are:

| | |
|---|---|
| AIRVOL® 205 (manufactured by Air Products & Chemicals, Inc. of Allentown, Pennsylvania) | Low Viscosity unplasticized polyvinyl alcohol Molecular Weight: 15,000–27,000 Melting Point 230° C. 88% Hydrolyzed |
| VINEX® 2019 (manufactured by Air Products & Chemicals, Inc. of Allentown, Pennsylvania) | Low Viscosity plasticized polyvinyl alcohol Molecular Weight: 15,000–27,000 Melting Point 170° C. 88% Hydrolyzed |
| VINEX® 2144 (manufactured by Air Products & Chemicals, Inc. of Allentown, Pennsylvania) | Medium Viscosity plasticized polyvinyl alcohol Molecular Weight: 44,000–65,000 Melting Point 205° C. 88% Hydrolyzed |
| VINEX® 1025 (manufactured by Air Products & Chemicals, Inc. of Allentown, Pennsylvania) | Low Viscosity plasticized polyvinyl alcohol Molecular Weight: 15,000–27,000 Melting Point 170° C. 99% Hydrolyzed |
| VINEX® 2025 (manufactured by Air Products & Chemicals, Inc. of Allentown, Pennsylvania) | Low Viscosity plasticized polyvinyl alcohol Molecular Weight: 25,000–45,000 Melting Point 192° C. 88% Hydrolyzed |
| GOHSEFIMER® 5407 (manufactured by Nippon Gohsei K.K. of Osaka, Japan) | Molecular Weight: 23,600 Melting Point 100° C. 30–28% Hydrolyzed |
| GOHSEFIMER® LL02 (manufactured by Nippon Gohsei K.K. of Osaka, Japan) | Molecular Weight: 17,700 Melting Point 100° C. 41–51% Hydrolyzed |
| MOWIOL® 1074 (manufactured by American Hoechst Corp. of Parsippany, New Jersey) | Molecular Weight: 15,000–27,000 Melting Point 190° C. 74% Hydrolyzed |

Furthermore, additional polyvinyl alcohol-containing substances including polyvinyl alcohol and partially hydrolyzed polyvinyl acetate useful in the practice of our invention are as follows:

| Name | Viscosity Range (Centipoises) | Percent Hydrolysis |
|---|---|---|
| ELVANOL® 51-05 (manufactured by The Du Pont Company, Polymer Products Department, Wilmington, Delaware 19898) | 5–6 | 87–89 |
| ELVANOL® 52-22 (manufactured by The Du Pont Company, Polymer Products Department, Wilmington, Delaware 19898) | 21–26 | 87–89 |
| ELVANOL® 50-42 (manufactured by The Du Pont Company, Polymer Products Department, Wilmington, Delaware 19898) | 44–50 | 87–89 |
| ELVANOL® 85-82 (manufactured by The Du Pont Company, Polymer Products Department, Wilmington, Delaware 19898) | 24–32 | 99.0–99.8 |
| ELVANOL® 75-15 (manufactured by The Du Pont Company, Polymer Products Department, Wilmington, Delaware 19898) | 12–15 | 98.0–99.8 |
| ELVANOL® T-25 (manufactured by The Du Pont Company, Polymer Products Department, Wilmington, Delaware 19898) | 24–32 | 99.0–99.8 |
| ELVANOL® T-66 (manufactured by The Du Pont Company, Polymer Products Department, Wilmington, Delaware 19898) | 12–15 | 99.0–99.8 |
| ELVANOL® 90-50 (manufactured by The Du Pont Company, Polymer Products Department, Wilmington, Delaware 19898) | 12–15 | 99.0–99.8 |
| ALCOTEX® 72.5 (manufactured by the Harlow Chemical Co. Ltd. of Templefields, Harlow, Essex, England CM20 2BH) | 5.6–6.6 | 71.5–73.5 |
| ALCOTEX® 78 (manufactured by the Harlow Chemical Co. Ltd. of Templefields, Harlow, Essex, England CM20 2BH) | 5.5–6.5 | 76.0–79.0 |
| ALCOTEX® B72 (manufactured by the Harlow Chemical Co. Ltd. of Templefields, Harlow, Essex, England CM20 2BH) | 4.8–5.8 | 72.0–75.0 |
| ALCOTEX® F80/40 (manufactured by the Harlow Chemical Co. Ltd. of Templefields, Harlow, Essex, England CM20 2BH) | 38–42 | 78.8–82.1 |
| ALCOTEX® F88/4 (manufactured by the Harlow Chemical Co. Ltd. of Templefields, Harlow, Essex, England CM20 2BH) | 3.5–4.5 | 86.7–88.7 |
| ALCOTEX® F88/26 (manufactured by the Harlow Chemical Co. Ltd. of Templefields, Harlow, Essex, England CM20 2BH) | 24.5–27.5 | 86.7–88.7 |
| ALCOTEX® F88/40 (manufactured by the Harlow Chemical Co. Ltd. of Templefields, Harlow, Essex, England CM20 2BH) | 38.0–42.0 | 86.7–88.7 |
| ALCOTEX® F88/47 (manufactured by the Harlow Chemical Co. Ltd. of Templefields, Harlow, Essex, England CM20 2BH) | 45.0–49.0 | 86.7–88.7 |
| MOWIOL® 10-74 (manufactured by American Hoechst Celanese Corp., Building 5200, 77 Center Drive, P.O. Box 1026, Charlotte, North Carolina 28201-1026) | 8.5–11.5 | 71.6–75.2 |
| MOWIOL® 15-79 (manufactured by American Hoechst Celanese Corp., Building 5200, 77 Center Drive, P.O. Box 1026, Charlotte, North Carolina 28201-1026) | 13–17 | 79.3–83.7 |
| MOWIOL® 4-80 (manufactured by American Hoechst Celanese Corp., Building 5200, 77 Center Drive, P.O. Box 1026, Charlotte, North Carolina 28201-1026) | 3.5–4.5 | 78.8–82.0 |
| MOWIOL® 3-83 (manufactured by American Hoechst Celanese Corp., Building 5200, 77 Center Drive, P.O. Box 1026, Charlotte, North Carolina 28201-1026) | 2.5–3.5 | 80.4–84.8 |
| MOWIOL® 18-88 (manufactured by American Hoechst Celanese Corp., Building 5200, 77 Center Drive, P.O. Box 1026, Charlotte, North | 16.5–19.5 | 86.7–88.7 |

| Name | Viscosity Range (Centipoises) | Percent Hydrolysis |
|---|---|---|
| MOWIOL ® 40-88 (manufactured by American Hoechst Celanese Corp., Building 5200, 77 Center Drive, P.O. Box 1026, Charlotte, North Carolina 28201-1026) | 38–42 | 86.7–88.7 |
| MOWIOL ® 3-98 (manufactured by American Hoechst Celanese Corp., Building 5200, 77 Center Drive, P.O. Box 1026, Charlotte, North Carolina 28201-1026) | 3.0–4.0 | 98.0–98.8 |
| MOWIOL ® 6-98 (manufactured by American Hoechst Celanese Corp., Building 5200, 77 Center Drive, P.O. Box 1026, Charlotte, North Carolina 28201-1026) | 5–7 | 98.0–98.8 |
| MOWIOL ® 66-100 (manufactured by American Hoechst Celanese Corp., Building 5200, 77 Center Drive, P.O. Box 1026, Charlotte, North Carolina 28201-1026) | 62–70 | 98.8–100.0 |
| GOHSENOL ® NK-05 (manufactured by Nippon Gohsei K.K. (The Nippon Synthetic Chemical Industry Co., Ltd.) of No. 9-6, Nozaki-Cho, Kita-Ku, Osaka, 530 Japan) | 4.5–5.5 | 71.0–75.0 |
| GOHSENOL ® A-300 (manufactured by Nippon Gohsei K.K. (The Nippon Synthetic Chemical Industry Co., Ltd.) of No. 9-6, Nozaki-Cho, Kita-Ku, Osaka, 530 Japan) | 25–30 | 97–98.5 |
| GOHSENOL ® AH-22 (manufactured by Nippon Gohsei K.K. (The Nippon Synthetic Chemical Industry Co., Ltd.) of No. 9-6, Nozaki-Cho, Kita-Ku, Osaka, 530 Japan) | 50–58 | 97.7–98.4 |
| GOHSENOL ® C-500 (manufactured by Nippon Gohsei K.K. (The Nippon Synthetic Chemical Industry Co., Ltd.) of No. 9-6, Nozaki-Cho, Kita-Ku, Osaka, 530 Japan) | 25–27 | 96–97 |
| GOHSENOL ® GH-20 (manufactured by Nippon Gohsei K.K. (The Nippon Synthetic Chemical Industry Co., Ltd.) of No. 9-6, Nozaki-Cho, Kita-Ku, Osaka, 530 Japan) | 40–46 | 87–89 |
| GOHSENOL ® GL-03 (manufactured by Nippon Gohsei K.K. (The Nippon Synthetic Chemical Industry Co., Ltd.) of No. 9-6, Nozaki-Cho, Kita-Ku, Osaka, 530 Japan) | 3.0–3.7 | 87–89 |
| GOHSENOL ® GM-14L (manufactured by Nippon Gohsei K.K. (The Nippon Synthetic Chemical Industry Co., Ltd.) of No. 9-6, Nozaki-Cho, Kita-Ku, Osaka, 530 Japan) | 16–20 | 87–89 |
| GOHSENOL ® KA-20 (manufactured by Nippon Gohsei K.K. (The Nippon Synthetic Chemical Industry Co., Ltd.) of No. 9-6, Nozaki-Cho, Kita-Ku, Osaka, 530 Japan) | 5–7 | 78–82 |
| GOHSENOL ® KA-500 (manufactured by Nippon Gohsei K.K. (The Nippon Synthetic Chemical Industry Co., Ltd.) of No. 9-6, Nozaki-Cho, Kita-Ku, Osaka, 530 Japan) | 4.5–7.5 | 70–74 |
| GOHSENOL ® KH-20 (manufactured by Nippon Gohsei K.K. (The Nippon Synthetic Chemical Industry Co., Ltd.) of No. 9-6, Nozaki-Cho, Kita-Ku, Osaka, 530 Japan) | 44–52 | 78.5–81.5 |
| GOHSENOL ® KP-06 (manufactured by Nippon Gohsei K.K. (The Nippon Synthetic Chemical Industry Co., Ltd.) of No. 9-6, Nozaki-Cho, Kita-Ku, Osaka, 530 Japan) | 5–7 | 71–75 |
| GOHSENOL ® N-300 (manufactured by Nippon Gohsei K.K. (The Nippon Synthetic Chemical Industry Co., Ltd.) of No. 9-6, Nozaki-Cho, Kita-Ku, Osaka, 530 Japan) | 25–30 | 98–99 |
| GOHSENOL ® NH-26 (manufactured by Nippon Gohsei K.K. (The Nippon Synthetic Chemical Industry Co., Ltd.) of No. 9-6, Nozaki-Cho, Kita-Ku, Osaka, 530 Japan) | 60–68 | 99.4–100 |
| GOHSENOL ® NM-11Q (manufactured by Nippon Gohsei K.K. (The Nippon Synthetic Chemical Industry Co., Ltd.) of No. 9-6, Nozaki-Cho, Kita-Ku, Osaka, 530 Japan) | 13–16 | 99–100 |

Since the VINEX® materials are "preplasticized", no additional plasticizer need be added, however, plasticizer can be added up to an amount of about 13% by weight. On the other hand, the AIRVOL® 205 may be combined with additional plasticizer, for example, glycerine or any of the plasticizers set forth, supra. However, AIRVOL® 205 and polyvinyl alcohol materials similar thereto need not be plasticized to be useful for the purposes of our invention.

The following materials are both foaming agents and are also detergents useful in the practice of our invention:

STANDAPOL® 7023 (an anhydrous blend of Cocamide DEA and DEA-Myreth Sulfate detergent);

WITCONATE® AOK (manufactured by Witco Chemical Comapany (solid anionic alpha sulfonate)); and WITCONATE® 90 FLAKE (manufactured by Witco Chemical Company (solid anionic alpha sulfonate)).

The following materials are useful as secondary detergents but cannot be depended on for their foaming properties:

PLURONIC®F88 (a block copolymer of ethylene oxide and propylene oxide manufactured by BASF);

PLURONIC® F77 (a block copolymer of ethylene oxide and propylene oxide manufactured by BASF); and

WITCONATE® 90.

Additional examples of detergents which are also foaming agents are alkyl benzene sulfonates such as n-octyl benzene sulfonate (sodium salt).

An example of a foam booster (which is not a detergent) is:

INCROMIDE® CA (Cocamide DEA) manufactured by Croda, Inc.

Another example of a foam booster is a mixture of 1:1 Neodol 45-13:INCROMIDE® CA (Neodol 45-13 being a $C_{14}$-$C_{15}$ linear primary alcohol ethoxylate) (manufactured by the Shell Chemical Company).

Another example of a foaming agent that is also a detergent that is preferred for the practice of our invention is sodium lauryl sulfate.

In carrying out the process of our invention, polyvinyl alcohol or partially hydrolyzed polyvinyl alcohol is combined with plasticizer and added to an extruder simultaneously, downstream from the addition of the polyvinyl alcohol or partially hydrolyzed polyvinyl acetate/plasticizer mix, compatible fragrance or compatible fragrance combined with hydrophobic silica is fed into the extruder upstream from the feeding of the compatible fragrance and downstream from the feeding of the polyvinyl alcohol/plasticizer mix or partially hydrolyzed polyvinyl acetate/plasticizer mix, liquid detergent is optionally fed into the extruder. The extruded tow is cooled (without being immersed in water) and then pelletized. The pelletized product may be marketed as is or it may be formed into toilet rim blocks, for example.

In practicing the process of this invention to form a particulate polyvinyl alcohol/compatible fragrance composition or particulate partially hydrolyzed polyvinyl acetate/compatible fragrance composition, single screw or double screw extruders can be utilized. Some of the extruders that can be used are shown at pages 2416–267 and 332–349 of the Modern Plastics Encyclopedia 1982—1983.

More specifically, examples of extruders which are desirable for carrying out the process of the invention include:

1. The Krauss-Maffei twin screw extruder manufactured by the Krauss-Maffei Corporation/Extruder Division, 3629 West 30th Street, Wichita, Kans. 67277;
2. The CRT ("Counter-Rotating Tangential") Twin Screw Extruder manufactured by Welding Engineers, Inc., King of Prussia, Pa. 19406;
3. The Leistritz Twin Screw Dispersion Compounder manufactured by the American Leistritz Extruder Corporation, 198 U.S. Route 206 South, Sommerville, N.J. 08876;
4. The ZSK Twin Screw Co-Rotating Extruder manufactured by the Werner & Pfeiderer Corporation, 663 East Crescent Avenue, Ramsey, N.J. 07446;
5. The MPC/V Baker Perkins Twin Screw Extruder manufactured by the Baker Perkins Inc. Chemical Machinery Division, Saginaw, Mich. 48601;
5. The Berstorff twin screw or foam extrusion equipment manufactured by Berstorff Corporation, P. O. Box 240357, 8200-A Arrowridge Boulevard, Charlotte, N.C. 28224; and
6. The Theysohn TSK Co-Rotating Extruder manufactured by the Theysohn Corporation of 2 Corporate Drive, Suite F, Radford, Va. 24141.

Generally, in certain preferred embodiments, twin screw extruders such as those set forth above are used to mix the polyvinyl alcohol or partially hydrolyzed polyvinyl acetate with the perfume, silica (if needed), plasticizer, colorant and detergent (if needed) as well as foaming agent (if needed).

Such extruders comprise an inner shaft member to which an outer screw member is affixed coaxially. In a double-screw machine, there are two shafts, each of which drives an outer screw member. The screws are intermeshed so that they subject the material being extruded to high-shear conditions, which contribute to dispersing the silica/perfume within the polyvinyl alcohol or partially hydrolyzed polyvinyl alcohol polymers.

These extruders also comprise an outer barrel member which encloses the screw or screws. Such extruders over their length can be fitted with different screws on the shaft and with different barrels surrounding the screws. Thus, over the length of the extruder various types and amounts of shear action can be used. The variation is carried out along the length of the extruder so that as various ingredients are initially introduced into the interior of the extruder, as the ingredients are initially mixed, and as the components become more highly mixed or dispersed, the mixing and the shear action can be varied to obtain the particle size and amount of various materials to be dispersed entities in the matrix.

After the extrusion, the extrudate is usually cooled. This can be accomplished by suitable means such as belts, blowers and the like. The cooled extrudate comprises a matrix with dispersed entities. This extrudate is then comminuted to provide the finished particles by means known in the art.

In addition to the use of a single extruder, it will be apparent from this description that a series of extruders can be used to form extrudate. Thus, a perfume can be added in a small percentage in a first extruder followed by additional perfume and silica in a second extruder. Furthermore, detergent and compatible fragrance can be added in a first extruder followed by detergent, silica and perfume in a second extruder with the detergent being added separately from the silica and perfume.

The extrusion and subsequent comminution enable the facile control of the size of the dispersed entities and the overall size of the particulate fragrancing polymers. This, in turn, provides control over the ultimate properties of the particulate fragranced polymers as taught herein.

BRIEF DESCRIPTION OF THE DRAWINGS

FIG. 1A is an elevation, partly in section of extruder apparatus used in preparing particulate fragranced polymeric particles according to our invention wherein the compatible fragrance composition is first combined with silica and the compatible fragrance/silica composition is fed into the extruder downstream from the feeding of plasticized polyvinyl alcohol or partially hydrolyzed polyvinyl acetate FIG. 1B is another embodiment of an elevation, partly in section of extruder apparatus used in preparing compatible fragrance bearing polymeric particles according to our invention wherein liquid detergent is fed into the extruder downstream from the feeding of plasticized polymer and upstream from the feeding of compatible fragrance combined with hydrophobic silica.

FIG. 2A is another elevation embodiment, partly in section, of extruder apparatus used in preparing compatible fragrance bearing polymeric particles according to our invention where the compatible fragrance (without silica) is fed into the extruder downstream from the plasticized polyvinyl alcohol or partially hydrolyzed polyvinyl acetate.

FIG. 2B is another elevation embodiment, partly in section, of extruder apparatus used in preparing compatible fragrance bearing polymeric particles according to our invention wherein liquid detergent is fed into the extruder upstream from the feeding of the compatible fragrance (with silica) but downstream from the feeding of plasticized polyvinyl alcohol or partially hydrolyzed polyvinyl acetate FIG. 2C is another elevation embodiment, partly in section, of extruder apparatus used in preparing compatible fragrance bearing polymeric particles according to our invention wherein liquid detergent is admixed with a dye (color former) and the resulting mixture is fed into the extruder upstream from the feeding of the compatible fragrance (with silica) but downstream from the feeding of plasticized polyvinyl alcohol or partially hydrolyzed polyvinyl acetate.

FIG. 2D is another elevation embodiment, partly in section, of extruder apparatus used in preparing compatible fragrance bearing polymeric particles according to our invention wherein liquid detergent in admixture with dye (color former), optionally in further admixture with plasticizer and/or foam booster is fed into the extruder upstream from the feeding of the compatible fragrance (with silica) but downstream from the feeding of plasticized polyvinyl alcohol or partially hydrolyzed polyvinyl acetate.

FIG. 8A is a partial cut-away elevation view of a section in detail of apparatus in accordance with U.S. Pat. No. 4,168,550 the specification for which is incorporated by reference herein showing a rim block of our invention used in conjunction with a heating element and temperature regulating means used in conjunction with an additive liquid contained in the container of the apparatus of U.S. Pat. No. 4,168,550 whereby the temperature of the additive liquid is maintained at steady state at a level above room temperature (e.g., 45° C.) as a result of automatic regulation of the heating elements energy output using the thermostat means.

FIG. 8B is a partial cut-away perspective view of the apparatus in accordance with U.S. Pat. No. 4,168,550 wherein the rim block of our invention is incorporated therein, in place in a flush tank, said apparatus comprising a two compartment container for holding additive liquid and integrated with said container three conduit means, two of the conduit means leading from the container portion of the apparatus of U.S. Pat. No. 4,168,550 into the flush tank through a common tube associated with the apparatus of U.S. Pat. No. 4,168,550 and a third conduit means leading from the apparatus of U.S. Pat. No. 4,168,550 into the proximate atmosphere surrounding the flush tank. U.S. Pat. No. 4,168,550 is incorporated herein by reference.

FIGS. 10A, 10B and 10C are partial cut-away side elevation views of flush tank toilets showing placing of blocks containing the composition of matter of our invention. Thus, in FIG. 10A, the block is set forth as a rim block in the toilet bowl and a block in the flush tank; in FIG. 10B, the composition of matter is contained in a rim block in a toilet bowl; and in FIG. 10C, the block containing the composition of matter of our invention is shown in a flush tank resting on the bottom thereof.

FIG. 20 is a graph showing weight loss fraction (on the "Y" axis) versus time (days) on the "X" axis for accelerated weight loss for the articles of Example XVI containing VINEX® 2019 or VINEX® 2144 along with GOHSEFIMER® LL02 versus the market product, TOILET DUCK®. The market product, TOILET DUCK® is set forth in the graph indicated by reference numeral 205. The articles containing the VINEX® 2019 and VINEX® 2144 along with the GOHSEFIMER® LL02 are described in more detail in the detailed description of FIG. 20 and in the detailed description of Example XVI, infra.

DETAILED DESCRIPTION OF THE DRAWINGS

Figure 3:
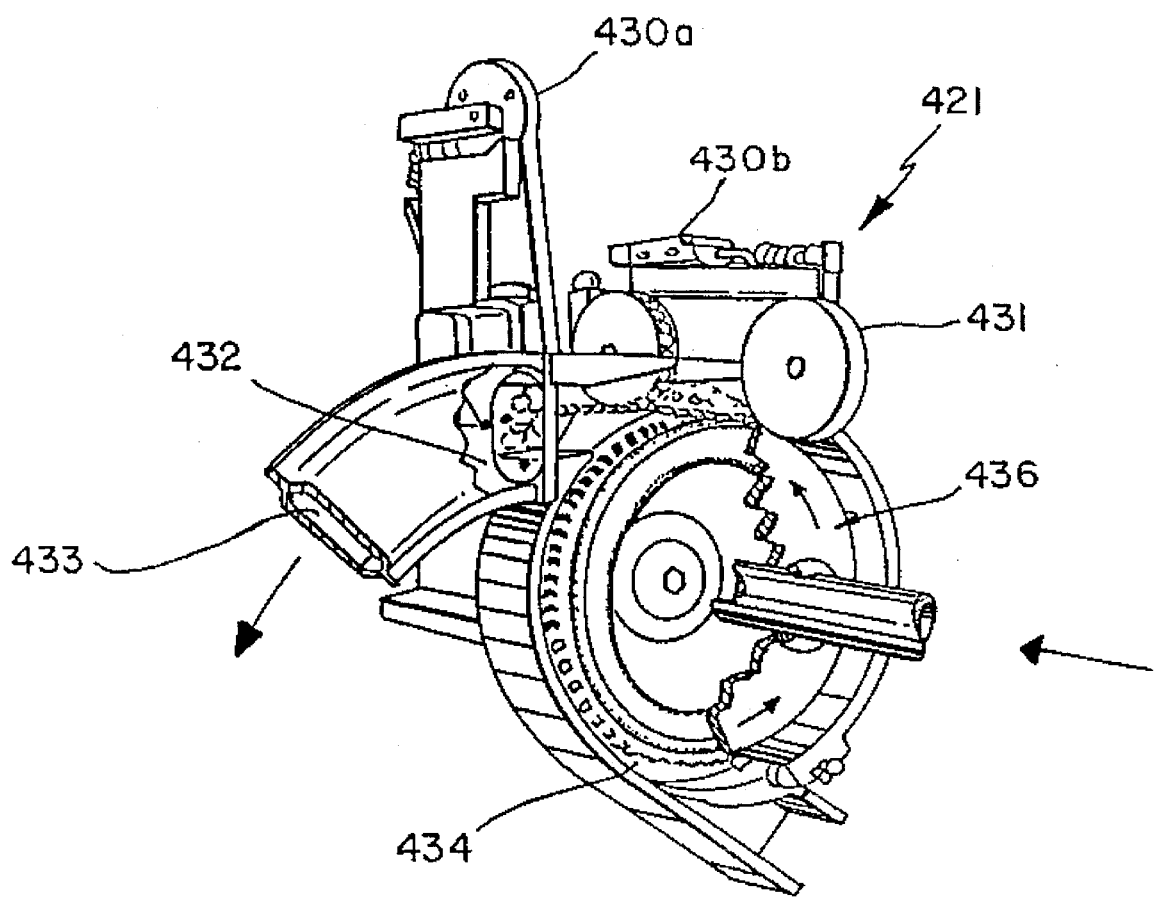
FIG. 3 is a cut-away perspective diagram of a pelletizing apparatus used in conjunction with the apparatus of FIGS. 1A, 1B, 2A and/or 2B and/or 2C and/or 2D whereby the extruded tow is pelletized.

FIGS. 1A, 1B, 2A, 2C and 2D are schematic cut-away elevation diagrams of apparatus useful in carrying out the process of our invention during the operation of said apparatus.

Motor 15 drives the extruder screws located at 23A in barrel 16, the extruder being operated at temperatures in the range of from about 150° C. up to about 250° C. At the beginning of the barrel, polyvinyl alcohol or partially hydrolyzed polyvinyl acetate at source 12 optionally together with additives, e.g., colors and additional plasticizers at location 13 is added via addition funnel 14 into the extruder. Simultaneously, when the operation reaches "steady state", silica from location 19 is added into fragrance container 17 with stirring and the resulting product is fed into the extruder at barrel segment S6, barrel 18c through feeder 24. It should be noted that when the silica is combined with the compatible fragrance, the resulting material is substantially in the solid state. The feed rate range of compatible fragrance may be between about 5 and about 20% by weight of the rate of resin added. The feed rate range of resin is about 80 up to about 300 pounds per hour. The extruded ribbon or cylinder is then passed from segment S10 of the extruder (shown in general by reference numeral 100) onto cooled belt 70 which is part of the cooling apparatus section shown in FIG. 7, described, infra. The tow 22 is then passed into the pelletizer 21, shown in detail in FIG. 3. The resulting pellets evolving from the pelletizer 21 are passed into collection container 21a.

In FIG. 1B, in addition to the compatible fragrance-silica composition fed via feeder 24 into extruder 100 at barrel segment S6 (18c), liquid detergent is simultaneously pumped into the extruder at barrel segment S2 from container 25 through line 26 past valve 27 using pump 28. The detergent can be an anionic, nonionic, cationic or zwitterionic detergent. When the detergent is used, it is used at a level of from about 1 up to about 5% by weight of the polyvinyl alcohol or hydrolyzed polyvinyl acetate resin containing plasticizer. In addition to the "liquid detergent" from location 25, the liquid detergent can be combined with a foaming material. The amount of foaming material or foaming agent may vary from 1 up to about 20% by weight of the polyvinyl alcohol or partially hydrolyzed polyvinyl acetate plasticized resin used.

FIG. 2A shows the process of our invention wherein no silica is used and the amount of perfume going into the extruder is from about 1 up to about 5% by weight of the polyvinyl alcohol or partially hydrolyzed polyvinyl acetate (plasticized) resin being fed from hopper 14 into the extruder. Thus, perfume from tank 17 is passed through valve "V" by means of gear pump 23 into extruder section S6 at barrel segment 18c simultaneously with the placing of the polyvinyl alcohol or partially hydrolyzed polyvinyl acetate into the extruder from hopper 14 at barrel segment S1.

In FIG. 2B, in addition to the passing of perfume composition from tank 17 into barrel segment S6, liquid detergent from tank 25 is passed through line 26 past valve 27 using pump 28 into barrel segment S2 of extruder 100 simultaneously with the passing of the perfume composition from tank 17 into barrel segment S6 and the passing of polyvinyl alcohol or partially hydrolyzed polyvinyl acetate (plasticized) from hopper 14 into barrel segment S1. Thus, there is combined detergent, compatible fragrance composition and polyvinyl alcohol (plasticized) or partially hydrolyzed polyvinyl acetate (plasticized). In addition, tank 25 can also hold a foaming agent in addition to the detergent and the combined foaming agent-detergent from tank 25 can be passed through line 26 past valve 27 using pump 28 into barrel segment S2.

In FIG. 2C, in addition to the passing of perfume composition from tank 17 into barrel segment S6, liquid detergent from tank 25 is passed through line 26 past valve 27 using pump 28 into mixing vessel 280 where it is mixed with color from tank 25a. The color is passed through line 26a through valve 27a using pump 28a into mixing vessel 280. The mixture of dye and detergent is then passed from mixing vessel 280 into barrel segment S2 of extruder 100, simultaneously with the passing of the perfume composition from tank 17 into barrel segment S6 and the passing of polyvinyl alcohol or partially hydrolyzed polyvinyl acetate from hopper 14 into barrel segment S1. Thus, there is combined detergent, compatible fragrance composition, color and polyvinyl alcohol (plasticized) or partially hydrolyzed polyvinyl acetate (plasticized) or not plasticized. In addition, tank 25 can also hold a foaming agent in addition to the detergent and the combined foaming agent—detergent from tank 25 can be passed through line 26 past valve 27 using pump 28 into barrel segment S2.

In FIG. 2D, in addition to the passing of perfume composition from tank 17 into barrel segment S6, liquid detergent from tank 25 is passed through line 26 past valve 27 using pump 28 into mixing vessel 280 where it is mixed with color from tank 25a which is passed through line 26a through valve 27a using pump 28a. Optionally, plasticizer and/or foam booster from tank 25b is passed through line 26b past valve 27b using pump 28b into mixing vessel 280. The mixed liquid detergent and color together, optionally with plasticizer and/or foam booster is then passed into barrel segment S2 of extruder 100 simultaneously with the passing of the perfume composition from tank 17 into barrel segment S6 and the passing of polyvinyl alcohol or partially hydrolyzed polyvinyl acetate (plasticized or not plasticized) from hopper 14 into barrel segment S1. Thus, there is combined detergent, compatible fragrance composition, dye, polyvinyl alcohol or partially hydrolyzed polyvinyl alcohol together with, optionally, additional plasticizer and/or foam booster. In addition, tank 25 can also hold a foaming agent in addition to the detergent and the combined foaming agent—detergent from tank 25 can be passed through line 26 past valve 27 using pump 28 into mixing vessel 280 and then into barrel segment S2.

FIG. 3 is a detailed cut-away perspective view of a pelletizer as is used in conjunction with the apparatus of FIGS. 1A, 1B, 2A, 2B, 2C and 2D. The extruded material 22 coming from the extruder 100 is fed into pelletizer at zero pressure into the pelletizer 21 at zero pressure at location 434. The pelletizer 21 is operated using a spinning extrusion dye 436 and operated by means of a rotating wheel 434. Moving pellet knife 431 and dual knife unit 430a and 430b cause pellets to be formed which fly into a cooling liquid nitrogen stream 432. The resulting pellets which are formed and contain compatible fragrance (with additional detergent, hydrophobic silica and foaming agent (optionally together with dye and/or foam booster)) exit from the pelletizer at 433.

Figure 4:
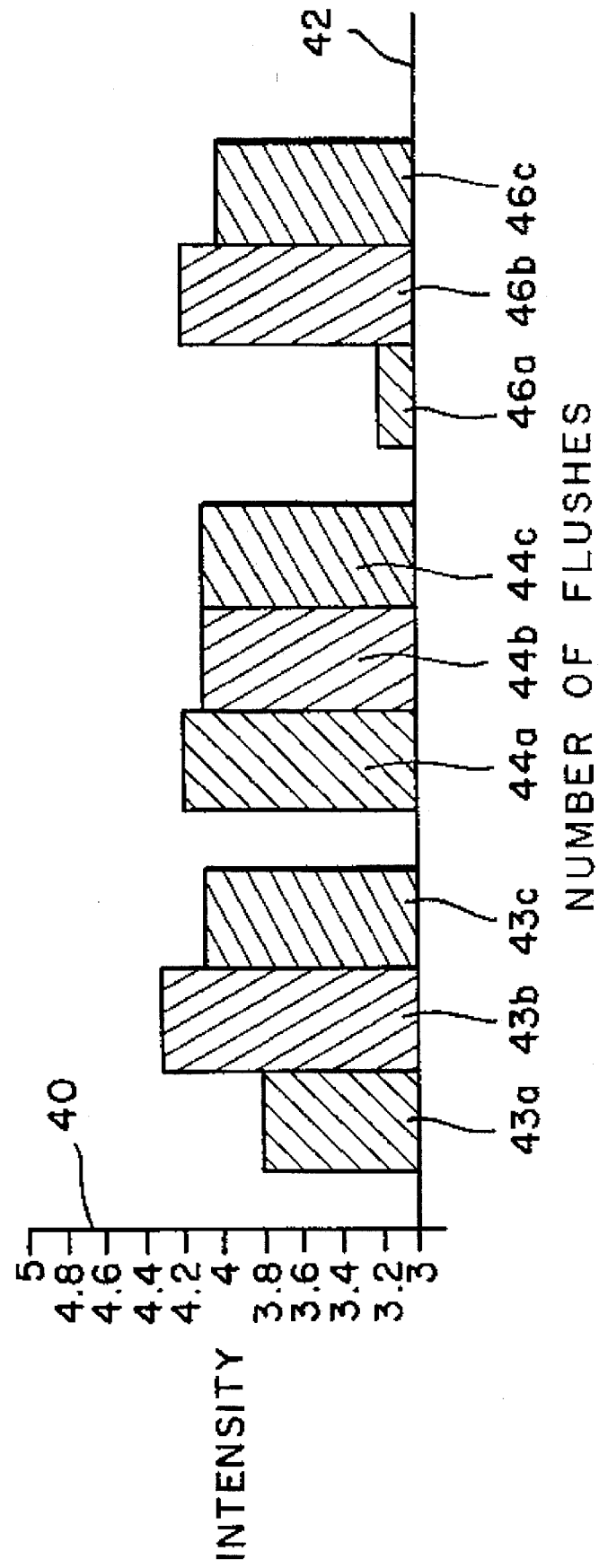
FIG. 4 is a bar graph of rim block compatible fragrance intensity versus number of flushes for rim blocks prepared according to our invention, containing polyvinyl alcohol (plasticized) or partially hydrolyzed polyvinyl acetate (plasticized). Number of flushes is on the "X" axis and intensity of compatible fragrance is on the "Y" axis. The bar graph sets forth the results of Example VI, supra.

FIG. 4 is a bar graph showing rim block compatible fragrance intensity versus number of flushes for the procedure of Example VI. The "Y" axis shows rim block compatible fragrance intensity and is indicated by reference numeral 40. The "X" axis shows number of flushes and is indicated by reference numeral 42. Reference numerals 43a, 43b and 43c are for eight flushes. Reference numerals 44a, 44b and 44c are for ten flushes. Reference numerals 46a, 46b and 46c are for twenty-eight flushes. Reference numerals 43a, 44a and 46a are for prior art product GLORIX®. Reference numerals 43b, 44b and 46b are for the combination of 95% VINEX® 2144 and 5% rose fragrance. Reference numerals 43c, 44c and 46c are for a rim block made from 85% VINEX® 2144; 5% D17 hydrophobic silica; and 10% rose fragrance.

Figure 5:
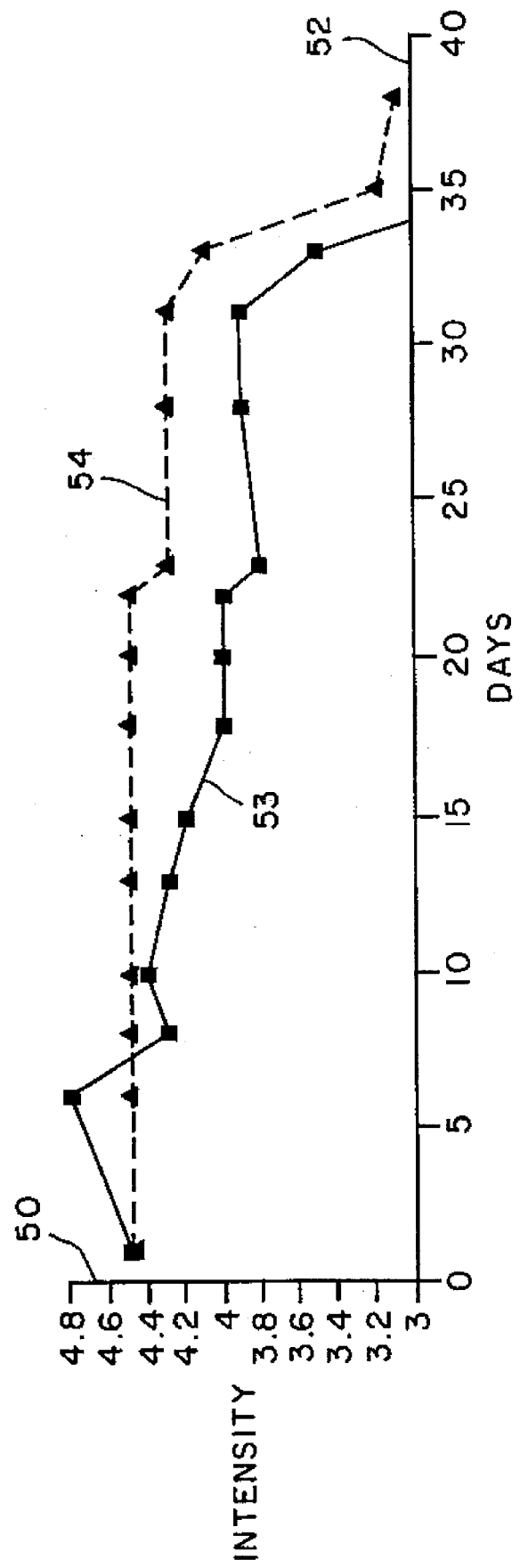
FIG. 5 is a graph of rim block compatible fragrance intensity versus time (days) for a control versus a polyvinyl alcohol-containing rim block, also containing compatible fragrance produced according to Example VII. The "X" axis is "days" and the "Y" axis is "intensity" of the rim block compatible fragrance.

FIG. 5 is a graph showing rim block compatible fragrance intensity versus time (days) for product produced according to Example VII. The "Y" axis is for rim block compatible fragrance intensity and is indicated by reference numeral 50. The "X" axis is for time in days and is indicated by reference numeral 52. The graph indicated by reference numeral 54 is the graph for polyvinyl alcohol containing silica and compatible fragrance, to wit:

70% VINEX® 2144;

10% D17 hydrophobic silica; and

20% compatible fragrance.

The graph indicated by reference numeral 53 is for the control which contains:

70% MARLON® A390 sodium dodecyl benzene sulfinate;

22% sodium sulfate;

2% ETHYLAN® LBC foam booster; and

6% compatible fragrance.

Figure 6:
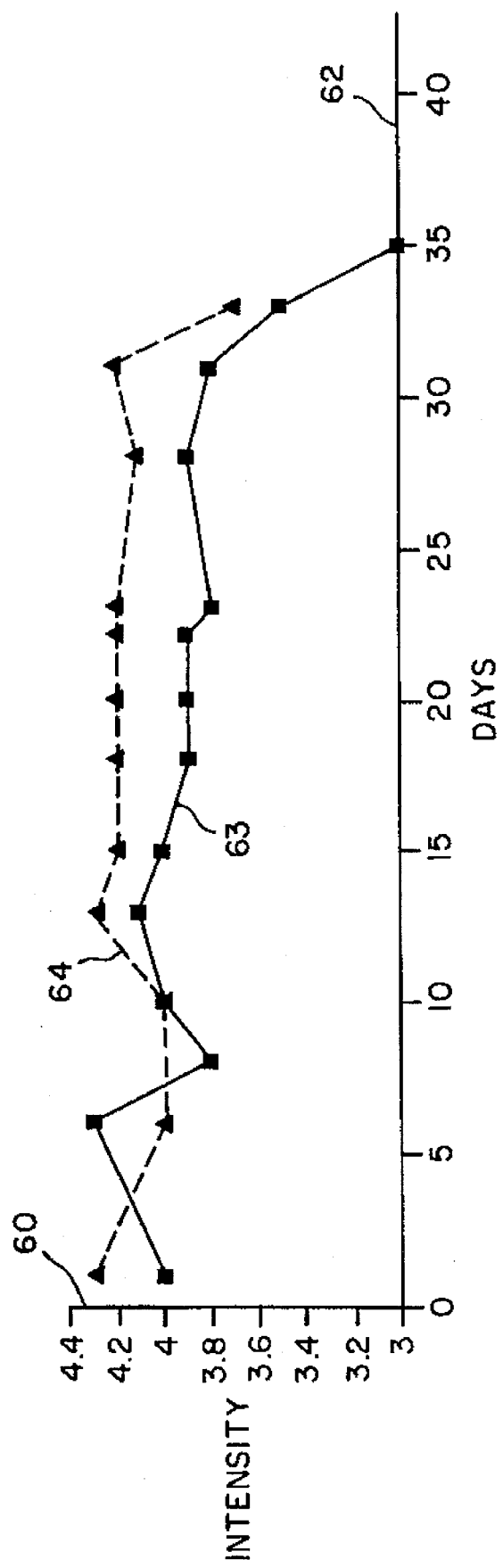
FIG. 6 is a graph of rim block compatible fragrance intensity versus time (days) for a polyvinyl alcohol-containing rim block prepared according to Example VIII and a control. The "X" axis shows time (days) and the "Y" axis shows rim block compatible fragrance intensity on a scale of 1–5.

FIG. 6 is a graph of rim block compatible fragrance intensity versus time (days) for the product produced according to the procedure of Example VIII. The "Y" axis for rim block compatible fragrance intensity is indicated by reference numeral 60. The "X" axis for time is indicated by reference numeral 62. The graph indicated by reference numeral 64 is the graph for the rim block of the experiment, to wit:

70% VINEX® 2144;

10% D17 hydrophobic silica; and

20% compatible fragrance.

The graph indicated by reference numeral 63 is for the control, to wit:

70% MARLON® A390 sodium dodecyl benzene sulfinate;

22% sodium sulfate;

2% ETHYLAN® LBC foam booster; and

6% compatible fragrance.

Figure 7:
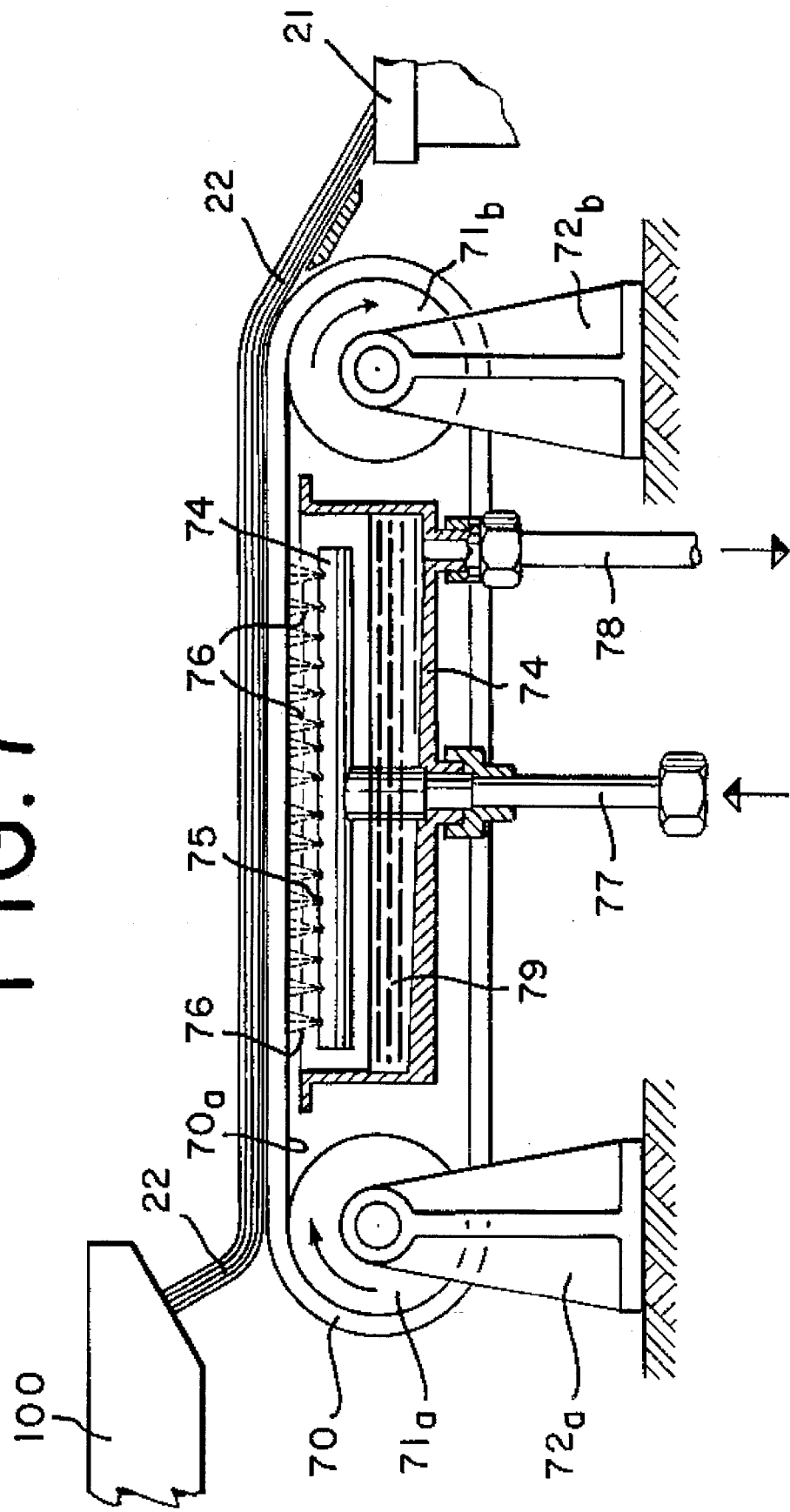
FIG. 7 is a cut-away side elevation view of the cooling apparatus used to cool the extruded tow evolved from the extrusion apparatus of FIGS. 1A, 1B, 2A and/or 2B and/or 2C and/or 2D.

FIG. 7 is a detailed cut-away side elevation view of the cooling section of the apparatus of FIGS. 1A, 1B, 2A, 2B, 2C and 2D. Polyvinyl alcohol (plasticized or not plasticized) or partially hydrolyzed polyvinyl acetate (plasticized or not plasticized) containing compatible fragrance as well as, optionally, silica detergent and foaming agent emanate from extruder 100 as tow 22 onto belt 70. Belt 70 is moved by wheels 71a and 71b. Belt 70 is cooled using water spray 70 evolving from cooling manifold 74. Cold water enters cooling manifold 74 at entrance 77 and the used water is collected at water collector 79 and is removed through pipe 78. Wheel 71a is supported by support 72a. Wheel 71b is supported by support 72b. The tow 22 after cooling is then passed into pelletizer 21. It should be noted that the water spray 76 impinges upon the cover surface 70a after emanating through orifices 75.

FIGS. 8A, 8B, 9, 10A, 10B and 10C show the use of the rim blocks produced according to Examples I–XXII.

FIGS. 8A and 8B set forth apparatus covered in U.S. Pat. No. 4,168,550 the specification for which is incorporated herein by reference. In that apparatus, the unit includes a container 812 which is fastened to the walls of the toilet flush tank or to the lip of the toilet flush tank 822 by retaining means 823. Container 812 contains a cleanser and/or sanitizer and/or aromatizing and/or deodorizing solution 819 (also referred to herein as "additive liquid" 819) Affixed to the walls of container 812 is rim block 899 produced according to any of Examples I–XXII, infra.

Leading out of the container 812 from below the surface of the additive liquid 819 is a siphon tube 813 which is connected at 824 with a wider tube 814 which is partially submerged into the toilet flush tank liquid. The tube 814 has an open (free) end 821. The connection between tube 813 and tube 814 at 824 is at a level above the bottom 825 of container 812. Tube 815 which is an outlet tube also leads away from container 812. Tube 815 which is an outlet tube also leads away from container 812 from above the level 818 of additive liquid 819 and has an open free end 820 extended into the atmosphere surrounding the toilet flush tank while the opposite end is tube 815 in container 812 is above the level 818 of the maximum height of additive liquid 819 located in container 812.

The air passing through the orifice of tube 813 may pass through sparger 829. In addition, the temperature T of liquid 819 can be controlled by use of heater element 830 wherein the temperature T of the liquid 819 is indicated on temperature indicator 831.

With respect to FIG. 8B, inlet means 844 is shown for tube 834A. The exit tube is shown by reference numeral 835 with the exit end shown by reference numeral 835b. Holding tank 838 is split into two compartments; shown by reference numerals 842 and 843 with the bottom of the holding tank shown by reference numeral 838a. Tube 834A branches into the tube 834 which goes into compartment 838 and tube 833 which goes into compartment 843. Rim block 899 (not shown in FIG. 8B) extends from compartment section 838 to compartment section 843. The operation of the apparatus of FIG. 8B is closely similar to that of the operation of the apparatus of FIG. 8A The operations of both the apparatus of FIGS. 8A and 8B are set forth in detail in U.S. Pat. No. 4,168,550 the specification for which is incorporated by reference herein, except for the use of the rim block which is novel in the instant application with regard to the invention of U.S. Pat. No. 4,168,550.

Figure 9:
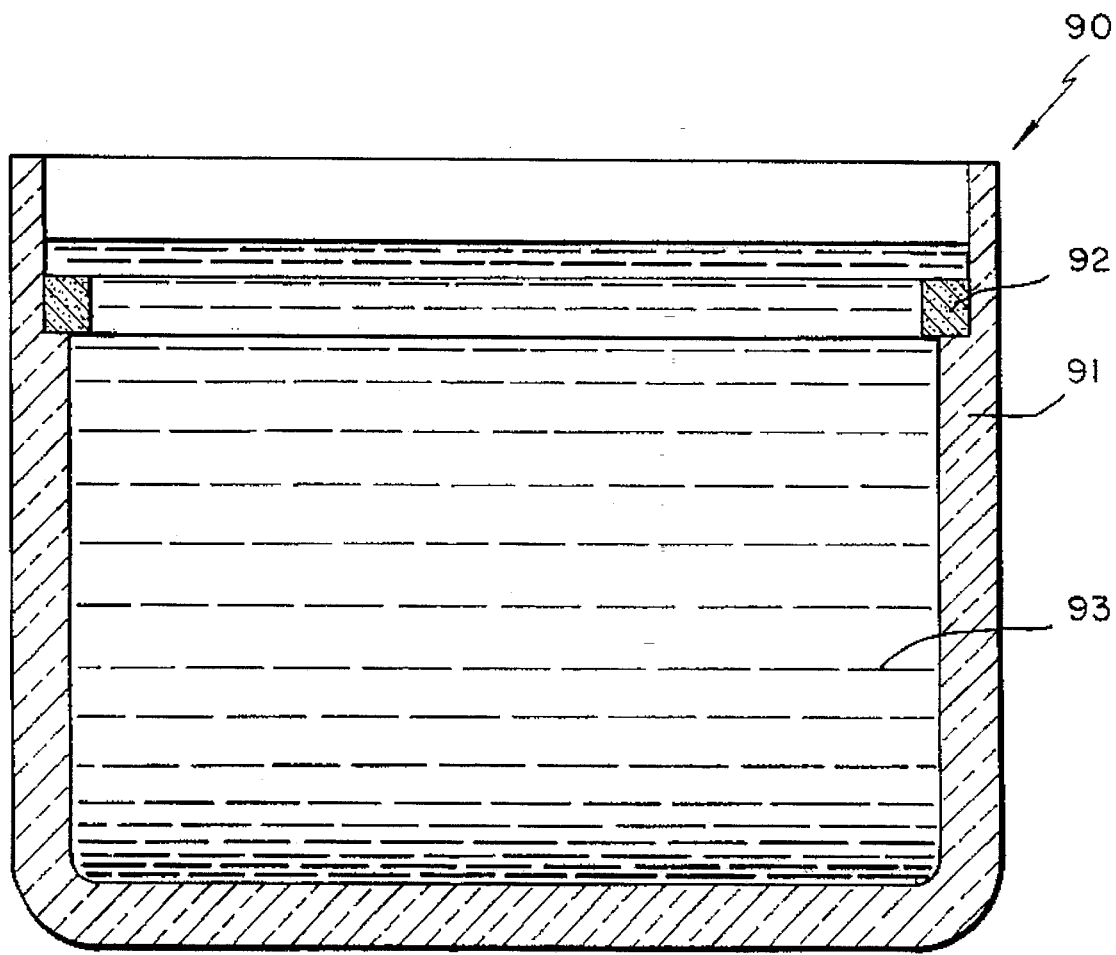
FIG. 9 is a schematic diagram of a flush tank (cut-away side elevation view) showing, in place, a solid toilet insertion freshener device containing the composition of matter of our invention.

FIG. 9 is a schematic cross section view of another toilet flush tank containing the rim block of our invention. The rim block of any of Examples I–XXII 92 is set into the tank 91 containing liquid 93. The overall tank is indicated by reference numeral 90. The rim block is biased so that it fits tightly against wall 91 in the tank. As the level of water proceeds in an upward direction in the tank (the water being indicated by reference numeral 93) compatible fragrance from the rim block enters the water and evolves into the atmosphere surrounding the tank as the polyvinyl alcohol or partially hydrolyzed polyvinyl acetate of the rim block dissolves. Thus, the feature of water solubility of the polyvinyl alcohol or partially hydrolyzed polyvinyl acetate is critical in the instant invention.

The term "compatible fragrances" is intended to mean "fragrance formulations" which are non-reactive under the extruder conditions with any of the materials with which any members of the fragrance formulation are in contact. Thus, if a fragrance formulation contains five components, each of the five components will be present in the same proportions and in unreacted condition on exiting from the extruder 100 and on exiting from the pelletizer 21, as in the entry into the extruder 100 from holding tank 17. Hence, the conditions in the extruder will not alter in any respect the "compatible perfume" formulation.

Referring to FIGS. 10A, 10B and 10C, the partial cut-away side elevation views of flush tank toilets showing the placing of blocks containing the composition of matter of our invention, FIG. 10A shows a flush tank 110 resting on the horizontal bottom thereof, block 104 containing the composition of matter of our invention. The overall flush tank toilet is indicated by reference numeral 100. The toilet bowl 108 has on its rim held by bracket 106 block 102.

Figure 11:
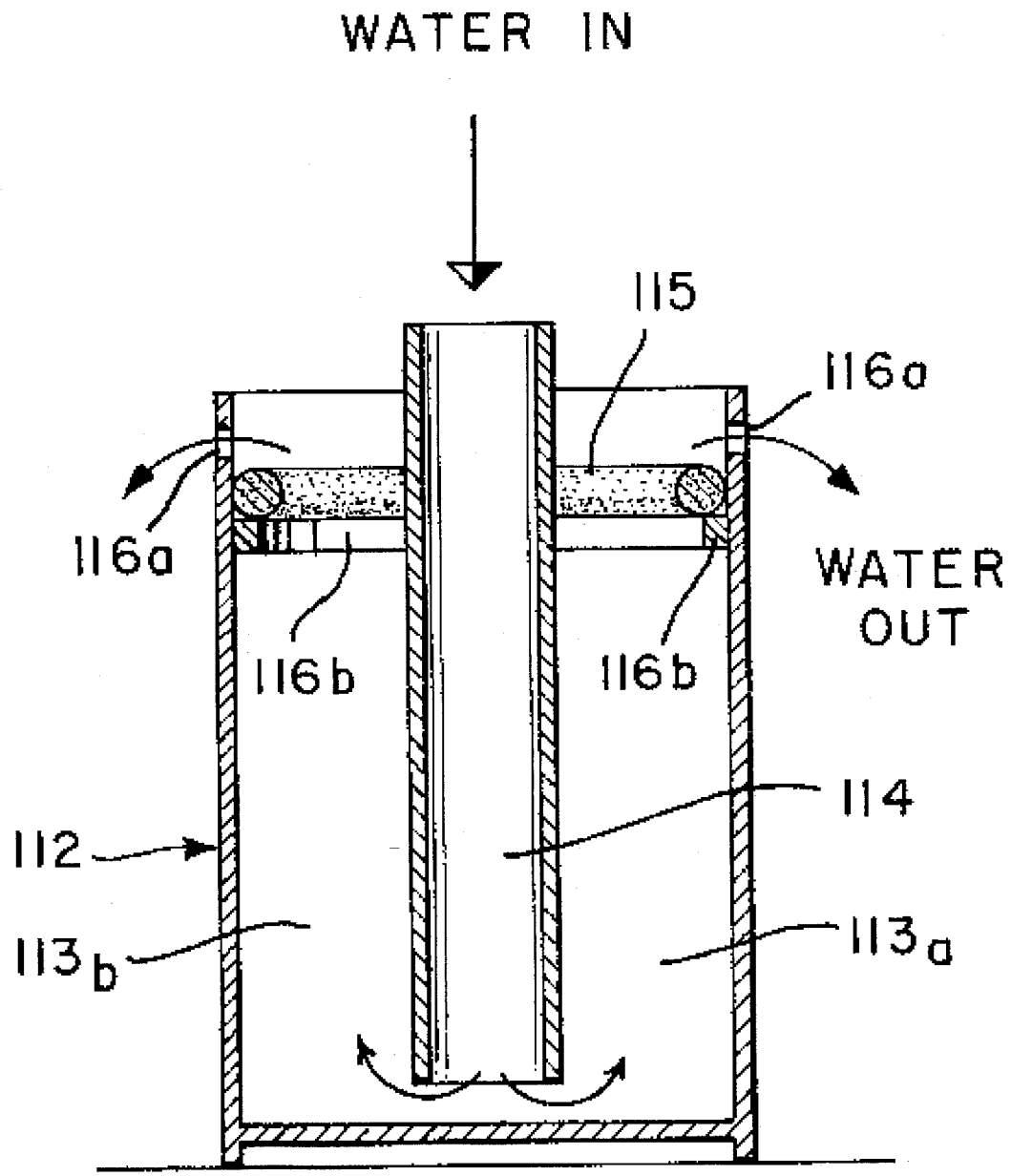
FIG. 11 is a schematic cut-away side elevation view of a flush tank having set on a platform contained therein a rim block containing the composition of matter of our invention.

FIG. 11 is a schematic cut-away side elevation view of a flush tank having set on platform 116b rim ring 115 containing the composition of matter of our invention. The platform is affixed to the sidewall 112. Water enters tube 114 and flows through the tank at locations 113a and 113b. The water passes the ring 315 held on the platform and then exits through portals 116a. The tank walls 112 as stated, supra, support the platform 116b on which the ring 115 is supported.

The following surfactants and dyes are useful in the practice of the examples set forth, supra, and referred to herein:

1. WITCONATE® 90 (Registered Trademark of the Witco Corporation, Organics Division): sodium dodecylbenzene sulfonate;
2. WITCONATE® AOK: sodium $C_{14}$-$C_{16}$ olefin sulfonate;
3. STANDAPOL® 7023 (Registered Trademark of the Henkel Corporation of Dusseldorf, Germany): a blend of sodium myreth sulfate DEA and cocamide DEA;
4. TEXAPON® V (Registered Trademark of the Henkel Corporation of Dusseldorf, Germany): sodium lauryl sulfate needles;
5. Sandoz VSG Blue Dye (manufactured by the Sandoz Chemical Company of Hanover, N.J.): Acid Blue No. 9 having the structure:

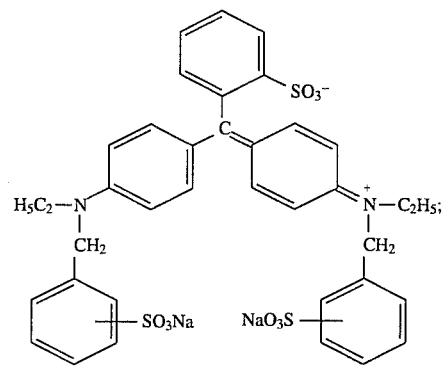

Figure 12:
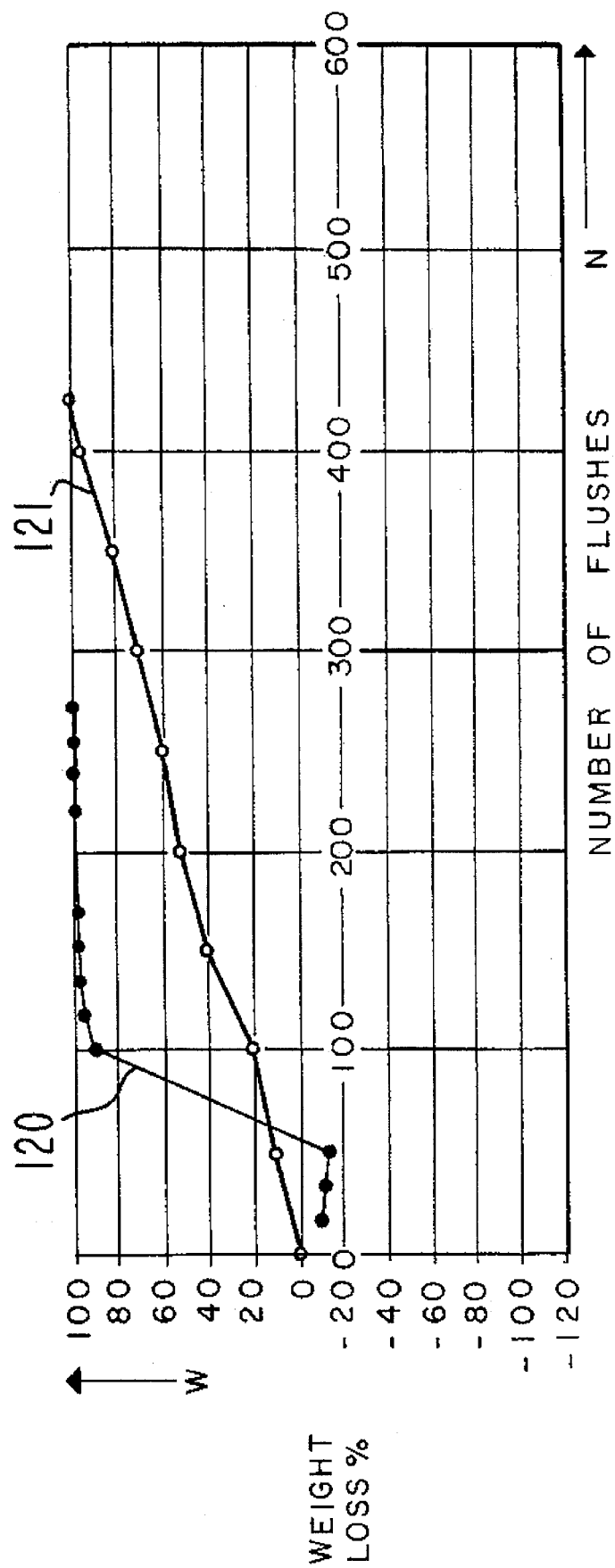
FIG. 12 is a graph showing weight loss (percent) versus number of flushes in toilets containing a GLORIX® market product (reference numeral 121) versus VINEX® 2019 of our invention (reference numeral 120) as more specifically described in Example IX, infra.

6. SIPERNAT® D17 (Registered Trademark of the Degussa Corporation): a silica silylate, more specifically precipitated dichlorosiloxane-treated hydrophobic silica having an average particle size of 6 microns and a bulk density of 9 pounds per cubic foot;
7. PLURONIC® F88 (Registered Trademark of the BASF Corporation of Germany): a solid having a melting point of 54° C.; an HLB value of 24; a block copolymer of ethylene oxide and propylene oxide;
8. PLURONIC® F77 (Registered Trademark of the BASF Corporation of Germany): a solid having a melting point of 48° C.; an HLB value of 24; a block copolymer of ethylene oxide and propylene oxide;
9. PLURONIC® F68 (Registered Trademark of the BASF Corporation of Germany): a solid having a melting point of 52° C.; an HLB value of 24; a block copolymer of ethylene oxide and propylene oxide;
10. TERGITOL® 15-S-9 (Registered Trademark of the Union Carbide Corporation): a liquid having an HLB value of 13.3; a mixture of $C_{11}$-$C_{15}$ ethoxylated secondary alcohol;
11. TERGITOL® 15-S-15 (Registered Trademark of the Union Carbide Corporation): a liquid having an HLB value of 15.4; a mixture of $C_{11}$-$C_{15}$ ethoxylated secondary alcohol;
12. TERGITOL® 15-S-30 (Registered Trademark of the Union Carbide Corporation): a waxy material having an HLB value of 17.4; a mixture of $C_{11}$-$C_{15}$ ethoxylated secondary alcohol;
13. TERGITOL® XJ (Registered Trademark of the Union Carbide Corporation): a block copolymer of ethylene oxide and propylene oxide;

14. TERGITOL® XD (Registered Trademark of the Union Carbide Corporation): PPG-24-buteth-27 (a block copolymer of ethylene oxide and propylene oxide);

15. TERGITOL® XH (Registered Trademark of the Union Carbide Corporation): a block copolymer of ethylene oxide and propylene oxide;

16. TRYCOL® 5946: a solid having an HLB value of 16.0; an ethoxylated tridecyl ether;

17. TRYCOL® 5949: a liquid having an HLB value of 12.5; an ethoxylated tridecyl alcohol;

18. NEODOL® 45-13 (Registered Trademark of the Shell Chemical Company): a paste having an HLB value of 14.5; a $C_{14}$-$C_{15}$ linear primary alcohol ethoxylate ($C_{14}$-$C_{15}$ pareth-11);

19. NEODOL® 25-9 (Registered Trademark of the Shell Chemical Company): a paste having an HLB value of 13.1; a $C_{12}$-$C_{15}$ linear primary alcohol ethoxylate ($C_{14}$-$C_{15}$ pareth-13);

20. NEODOL® 25-9 (Registered Trademark of the Shell Chemical Company): a paste having an HLB value of 13.1; a $C_{12}$-$C_{15}$ linear primary alcohol ethoxylate ($C_{14}$-$C_{15}$ pareth-9);

21. PEG 400 MO: a liquid having an HLB value of 12.0; polyethylene glycol-400-monooleate;

22. NORFOX® 92% (Registered Trademark of Norman, Fox and Company): sodium tallowate;

23. ICONOL® OP-10: a liquid having an HLB value of 14.0; an ethoxylated octylphenol;

24. ICONOL® OP-40: a solid having an HLB value of 18.0; an ethoxylated octylphenol;

Referring to FIG. 12, FIG. 12 is a graph for Example IX showing weight loss (percent) versus number of flushes in toilets containing a GLORIX® market product shown by the graph indicated by reference numeral 121 versus VINEX® 2019 of our invention (the graph being shown by reference 120).

Figure 13:
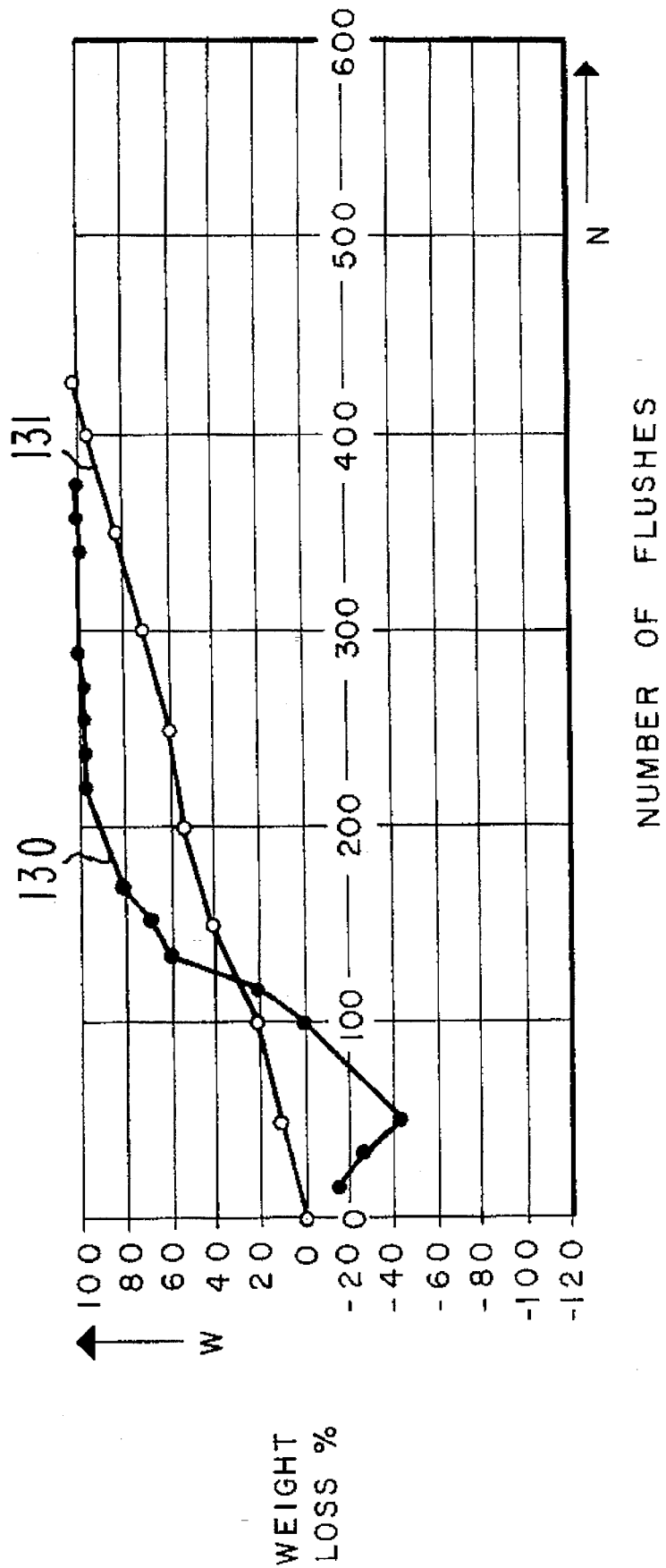
FIG. 13 is a graph showing weight loss (percent) versus number of flushes for a mixture of VINEX® 2019 and VINEX® 2144 (blend) versus the market product, GLORIX®. The GLORIX® is shown by reference numeral 131 and the blend of VINEX® 2019 and VINEX® 2144 is shown by reference numeral 130. The graph is for the article as more specifically described in Example X, set forth, infra.

FIG. 13 is a graph showing weight loss (percent) versus number of flushes for Example X for a mixture of VINEX® 2019 and VINEX® 2144 versus the market product GLORIX®. The graph for the GLORIX® is shown by reference numeral 131. The graph for the blend of VINEX® 2019 and VINEX® 2144 is shown by reference 130.

Figure 14:
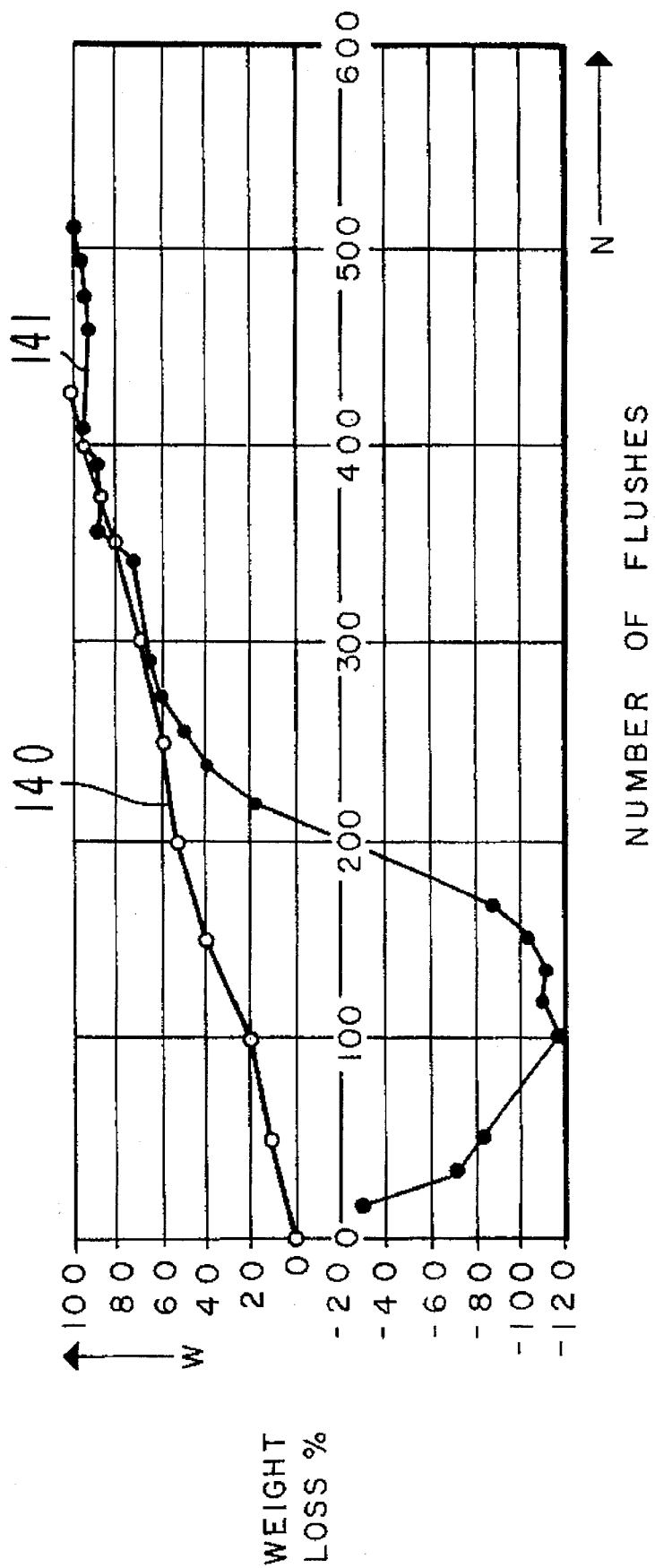
FIG. 14 is a graph of weight loss (percent) versus number of flushes for VINEX® 2144 (shown by reference numeral 141) versus the prior art market product, GLORIX® (shown by reference numeral 140). The product is more specifically described in Example XI, set forth, infra.

FIG. 14 is a graph for Example XI showing weight loss (percent) versus number of flushes for VINEX® (the graph being shown by reference numeral 141) versus the prior art market product, GLORIX® (the graph being shown by reference numeral 140).

Figure 15:
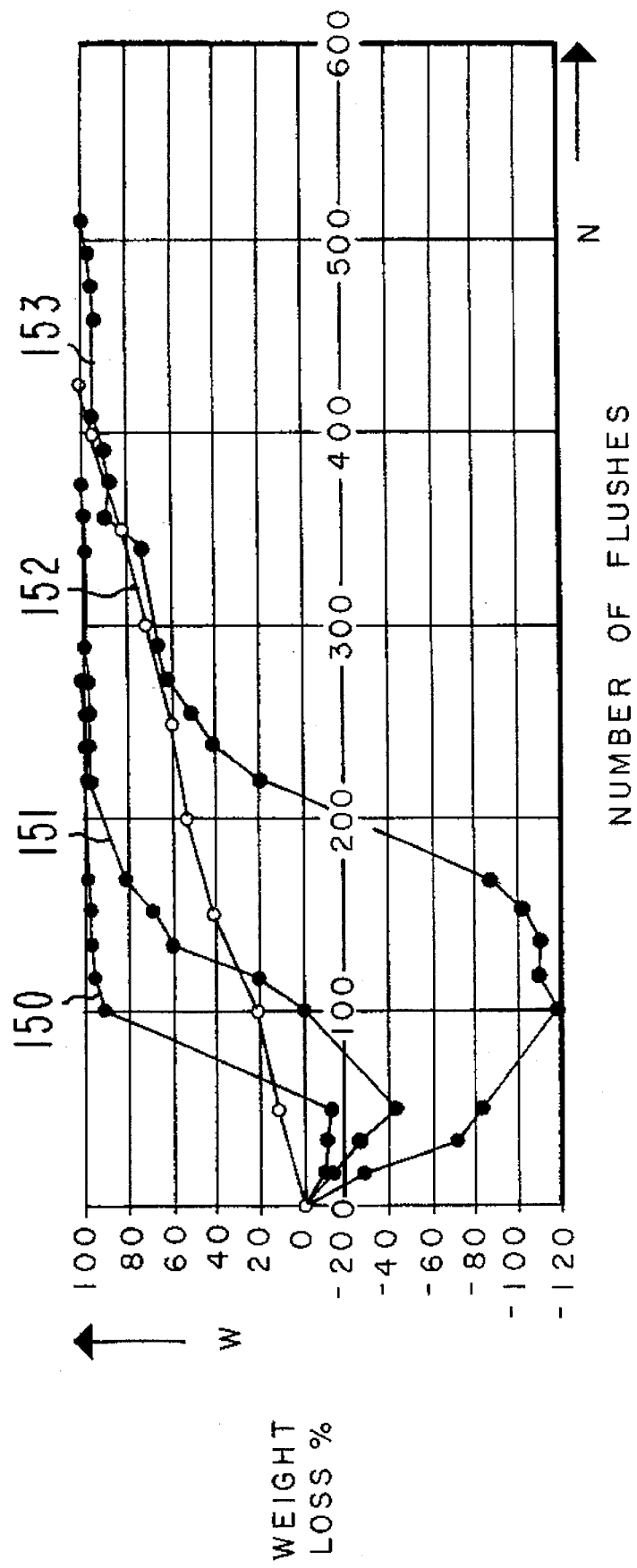
FIG. 15 is a graph showing weight loss (percent) versus number of flushes for the market product, GLORIX®, versus products set forth in Examples IX, X and XI which are mixtures of VINEX® 2019 with silica, detergent, fragrance and foam booster (Example IX); 50:50 blends of VINEX® 2019 and VINEX® 2144; silica, detergent, fragrance and foam booster (Example X); and mixtures of VINEX® 2144; silica, detergent, fragrance and foam booster (Example XI). The graph indicated by reference numeral 152 is for the GLORIX®. The graphs indicated by reference numerals 150, 151 and 153 are for the products of Examples IX, X and XI described in more detail, infra.

FIG. 15 is for Examples IX, X and XI (combined) showing weight loss (percent) versus number of flushes for the market product, GLORIX® (the graph being shown by reference numeral 152) versus products set forth in Examples IX, X and XI which are (i) mixtures of VINEX® 2019 with silica, WITCONATE® 90 detergent, fragrance and foam booster (Example IX; shown by the graph indicated by reference numeral 150); a 50:50 blend of VINEX® 2019 and VINEX® 2144; silica; detergent (WITCONATE® 90); fragrance and foam booster (Example X) shown by the graph indicated by reference numeral 151; and a blend of 48% VINEX® 2144; 10% silica; 20% detergent (WITCONATE® 90); 20% fragrance and 2% foam booster (Example XI) shown by the graph indicated by reference numeral 153.

Figure 16:
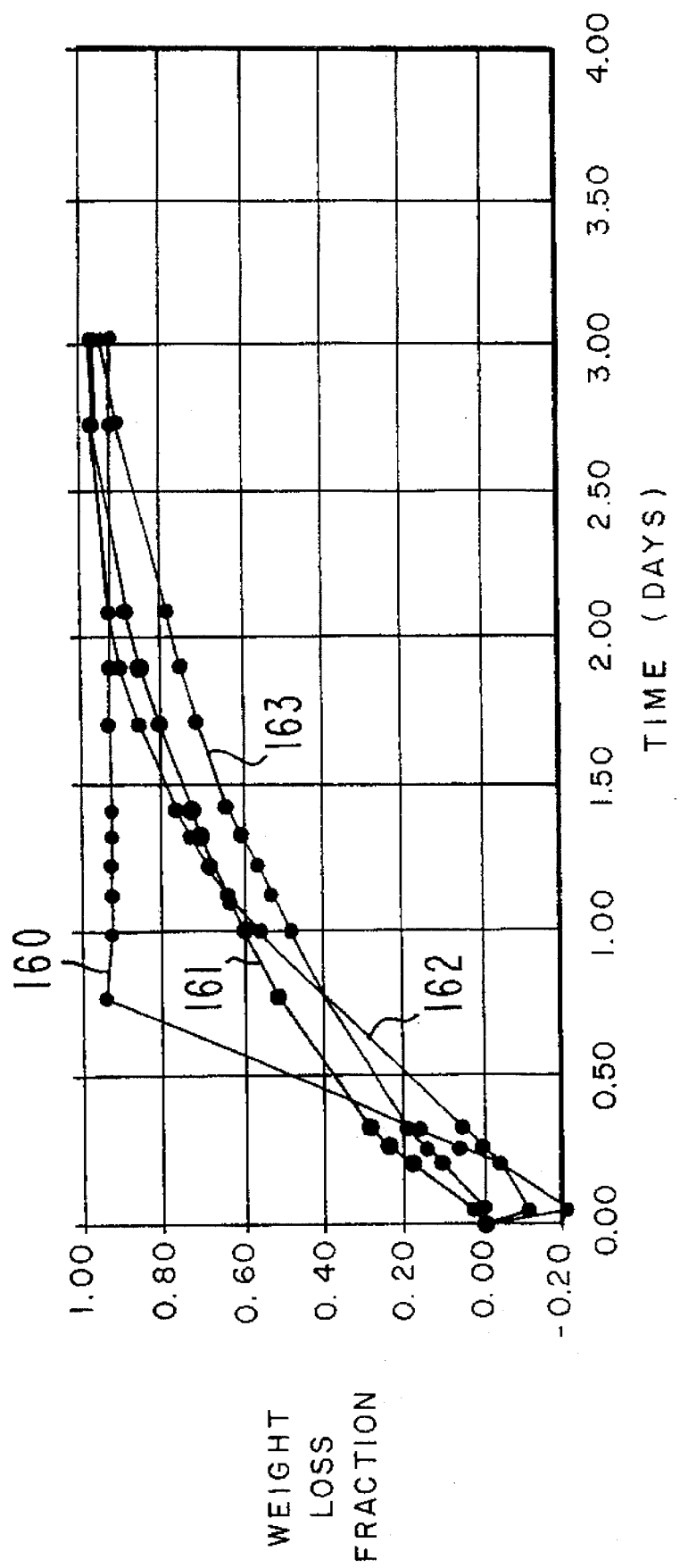
FIG. 16 is a graph showing weight loss fraction versus time (days) for the market product, GLORIX®; the market product: TOILET DUCK®; a mixture of 46% VINEX® 2144; silica; detergent; fragrance; and foam booster versus a mixture of 46% VINEX® 2144; silica; detergent; fragrance; and a lesser amount of foam booster. The mixtures containing the VINEX® 2144 are set forth further in detail in the description of Example XIII, infra.

FIG. 16 is a graph for Example XIII showing weight loss fraction versus time (days) for the market product, GLORIX® (the graph shown by reference numeral 161); the market product TOILET DUCK® (the graph shown by reference numeral 163); a mixture of 46% VINEX® 2144, silica, WITCONATE® 90 detergent, fragrance and foam booster (the graph being shown by reference numeral 162); and a mixture containing 46% VINEX® 2144, 10% silica, 20% WITCONATE® 90 detergent, 20% detergent and 2% foam booster (the graph shown by reference numeral 160).

Figure 17:
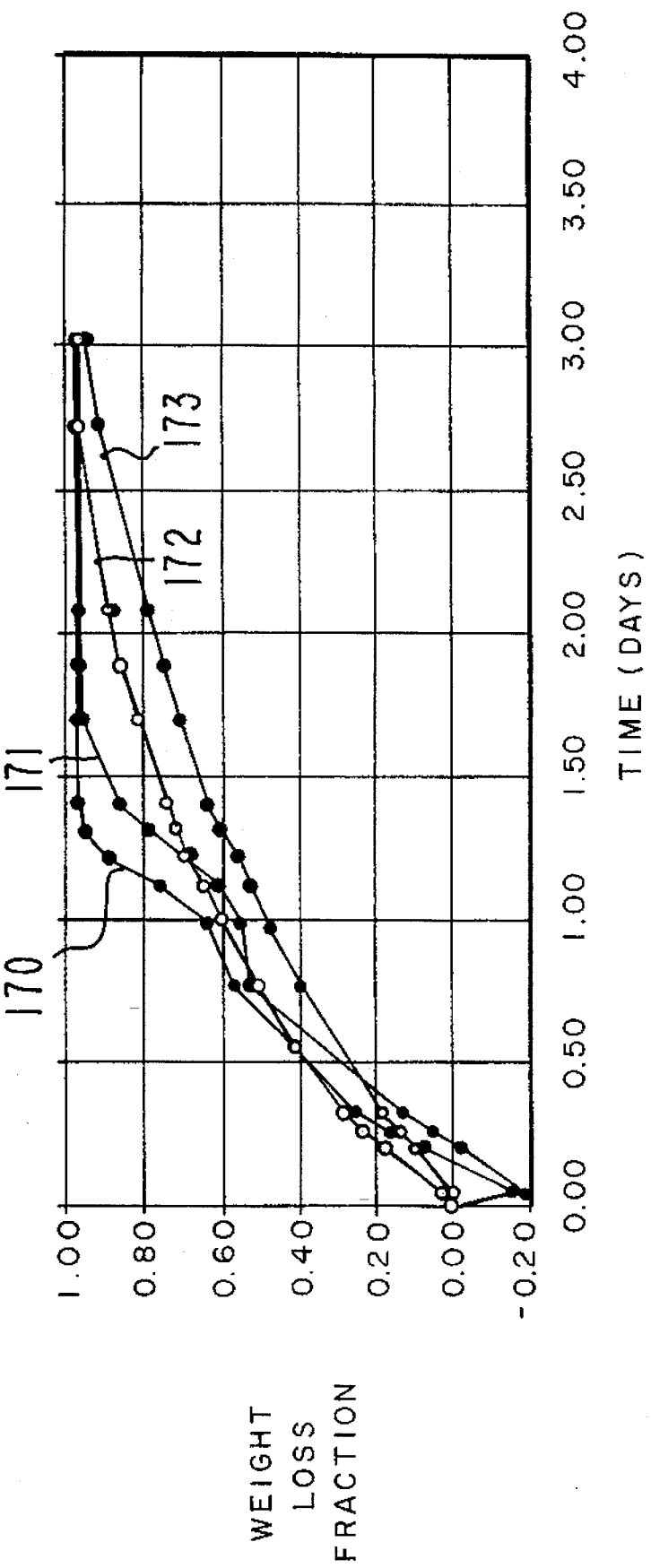
FIG. 17 is a graph of weight loss fraction versus time (days) for accelerated weight loss rim blocks showing a comparison of the market products, GLORIX®; TOILET DUCK®; and mixtures (shown by graphs 170 and 171) containing AIRVOL® 205; silica; detergent; second detergent; fragrance and foam booster. The formulations are shown further in detail in the detailed description of Example XIV, infra.

FIG. 17 is a graph for Example XIV showing weight loss fraction versus time (days) for accelerated weight loss rim blocks showing a comparison of the market products GLORIX® (the graph being shown by reference numeral 172); the market product TOILET DUCK® (the graph shown by reference numeral 173); the mixture containing 47% AIRVOL® 205, 10% silica, 18% WITCONATE® 90 detergent, 5% STANDAPOL® 7023 detergent and 20% fragrance (the graph shown by reference numeral 170) and the mixture of our invention containing 45% AIRVOL® 205, 10% silica, 18% WITCONATE® 90, 5% STANDAPOL® 7023, 20% fragrance and 2% foam booster (the graph shown by reference numeral 171).

Figure 18:
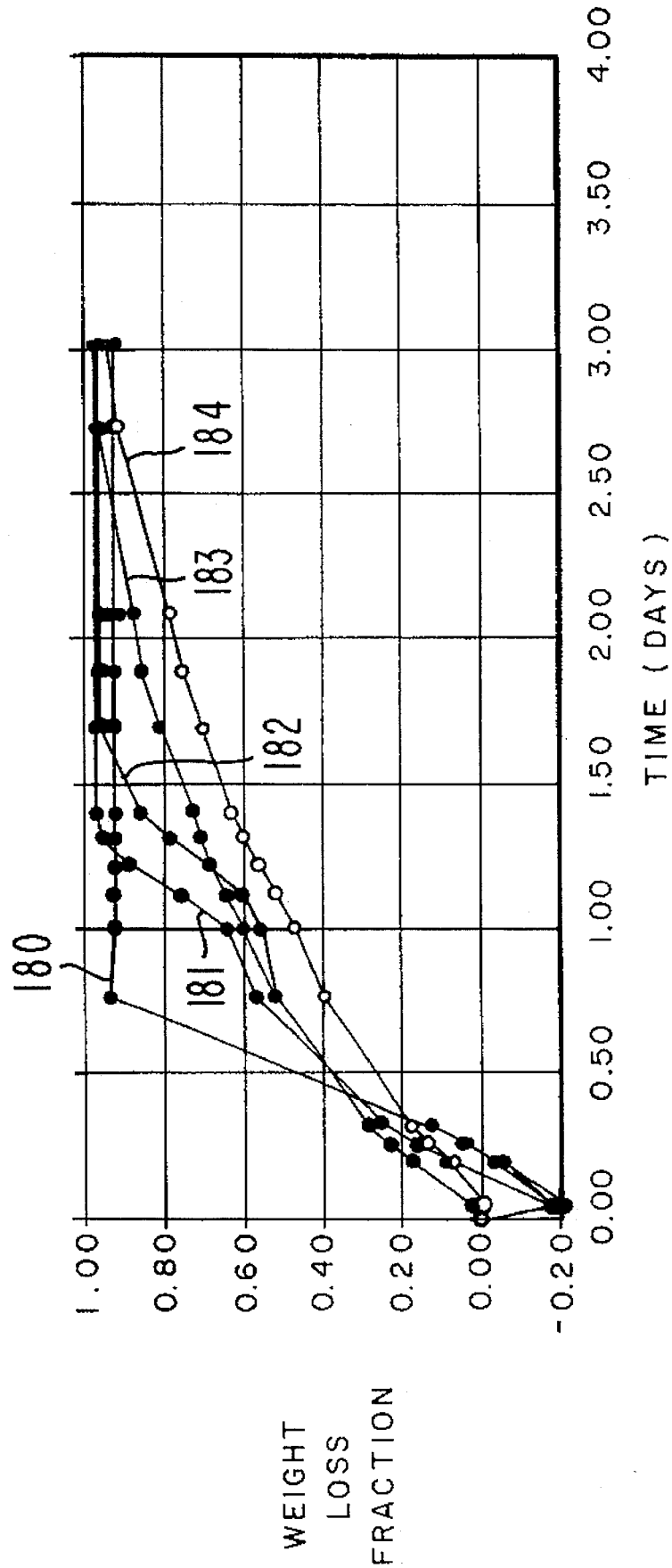
FIG. 18 is a graph showing weight loss fraction (on the "Y" axis) versus time (days) on the "X" axis for accelerated weight loss rim blocks containing the compositions of Examples XIII and XIV (containing AIRVOL® 205; silica; detergent; second detergent; fragrance and foam booster) versus the market products, TOILET DUCK® and GLORIX®. The details of the formulations for Examples XIII and XIV are set forth in the detailed descriptions of FIG. 18 and Examples XIII and XIV set forth, infra.

FIG. 18 is a graph for Examples XIII and XIV showing weight loss fraction on the "Y" axis versus time (days) on the "X" axis for accelerated weight loss rim blocks containing the compositions of Examples XIII and XIV. The graph for the composition of Example XIII containing 46% VINEX® 2144, 10% silica, 20% WITCONATE® 90, 20% fragrance and 2% foam booster is indicated by reference numeral 180. The graph for the composition of our invention for Example XIV containing 47% AIRVOL® 205, 10% silica, 18% WITCONATE® 90, 5% STANDAPOL® 7023 and 20% fragrance is indicated by reference numeral 181. The graph for the mixture of our invention for Example XIV containing 45% AIRVOL® 205, 10% silica, 18% WITCONATE® 90, 5% STANDAPOL® 7023, 20% fragrance and 2% foam booster is indicated by reference numeral 182. The graph for the market product, GLORIX® is indicated by reference numeral 183. The graph for the market product, TOILET DUCK® is indicated by reference numeral 184.

Figure 19:
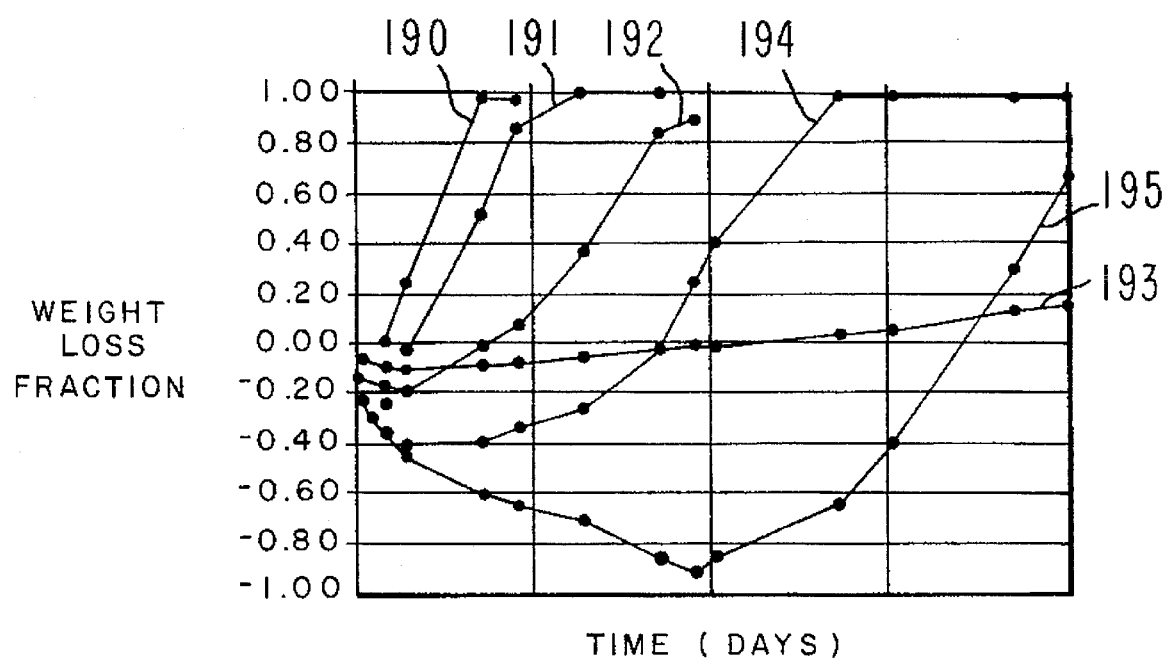
FIG. 19 sets forth a graph showing weight loss fraction (on the "Y" axis) versus time (days) on the "X" axis for accelerated weight loss in-tank for blocks containing VINEX® 2144; silica; detergent (WITCONATE® 90); fragrance; and the dye, Acid Blue No. 9. The formulations are set forth in detail in Example XV and in the DETAILED DESCRIPTION OF THE DRAWINGS section, infra.

FIG. 19 sets forth a graph showing weight loss fraction on the "Y" axis versus time (days) on the "X" axis for Example XV for accelerated weight loss in-tank for toilet rim blocks containing VINEX® 2144, silica, WITCONATE® 90 (in varying quantities), fragrance and the dye Acid Blue No. 9. In each case, the formulation contains 62% VINEX® 2144, 13% silica, 20% fragrance and 5% Acid Blue No. 9. The graph indicated by reference numeral 190 contains 20% WITCONATE® 90. The graph indicated by reference numeral 191 contains 15% WITCONATE® 90. The graph indicated by reference numeral 192 contains 10% WITCONATE® 90. The graph indicated by reference numeral 194 contains 5% WITCONATE® 90. The graph indicated by reference numeral 195 does not contain any WITCONATE® 90 and does not contain any other detergent. The graph indicated by reference numeral 193 is for the market product, TOILET DUCK®.

Figure 20:
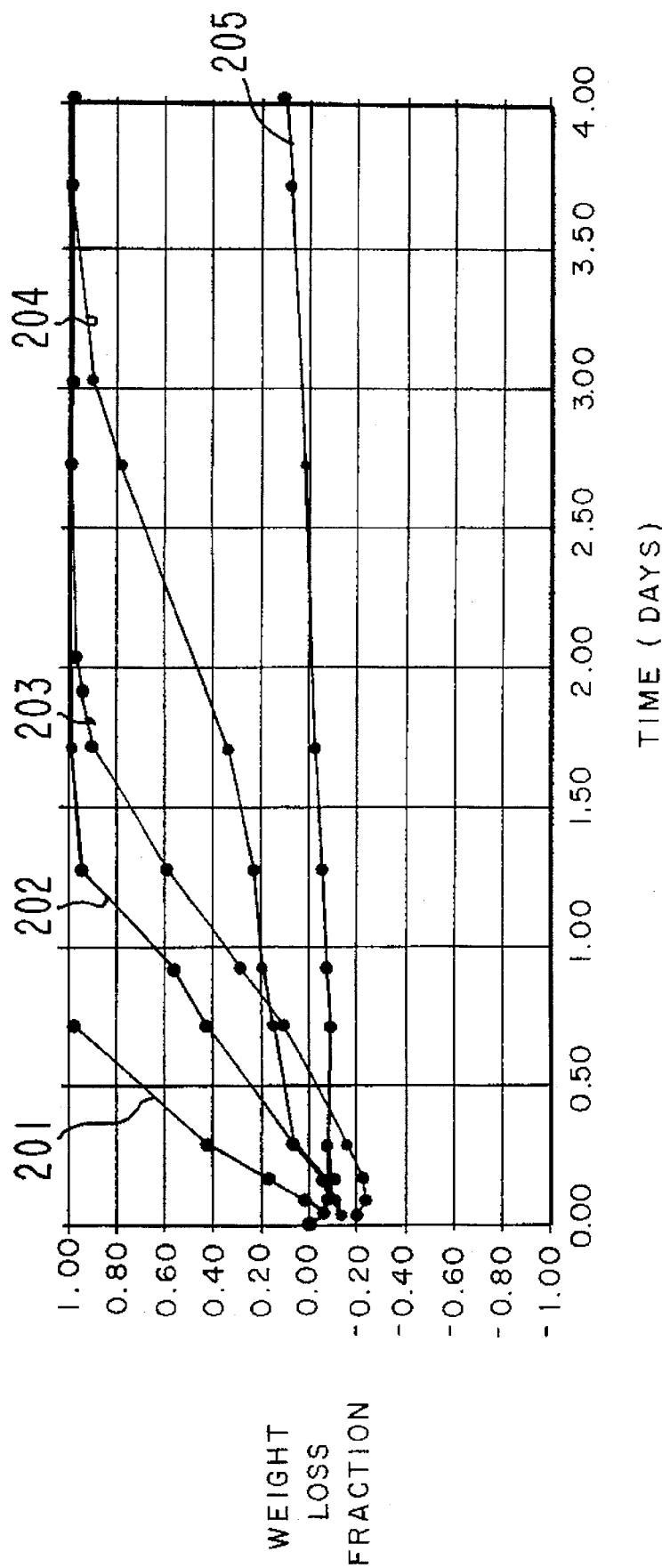
FIG. 20 sets forth weight loss fraction (on the "Y" axis) versus time (days) on the "X" axis for accelerated weight loss for the products of Example XVI containing VINEX® 2019 or VINEX® 2144 containing (or not containing) GOHSEFIMER® LL02 versus the market product, TOILET DUCK®. The market product, TOILET DUCK® is set forth in the graph indicated by reference numeral 205. The products containing the VINEX® and the GOHSEFIMER® LL02 are set forth in graphs 201, 202, 203 and 204. Detailed descriptions of the products of Example XVI are set forth in the DETAILED DESCRIPTION OF THE DRAWINGS section, infra and in the detailed description of Example XVI, set forth, infra.

FIG. 20 is a graph for Example XVI showing weight loss fraction on the "Y" axis versus time (days) on the "X" axis for accelerated weight loss for articles containing VINEX® 2019, silica, GOHSEFIMER® LL02, fragrance and Acid Blue No. 9. The graph indicated by reference numeral 201 is for the block having the formulation containing 62% VINEX® 2019, 13% silica no GOHSEFIMER® LL02, 20% fragrance and 5% Acid Blue No. 9. The graph indicated by reference numeral 202 is for the block containing the formulation containing 42% VINEX® 2019, 13% silica, 20% GOHSEFIMER® LL02, 20% fragrance and 5% Acid Blue No. 9. The graph indicated by reference numeral 204 is for the block containing the formulation containing 20% VINEX® 2019, 13% silica, 42% GOHSEFIMER® LL02, 20% fragrance and 5% Acid Blue No. 9. The graph indicated by reference numeral 203 is for the block containing the formulation containing 42% VINEX® 2144, 13% silica, 20% GOHSEFIMER® LL02, 20% fragrance and 5% Acid Blue No. 9. The graph indicated by reference numeral 205 is for the market product, TOILET DUCK®.

Figure 21:
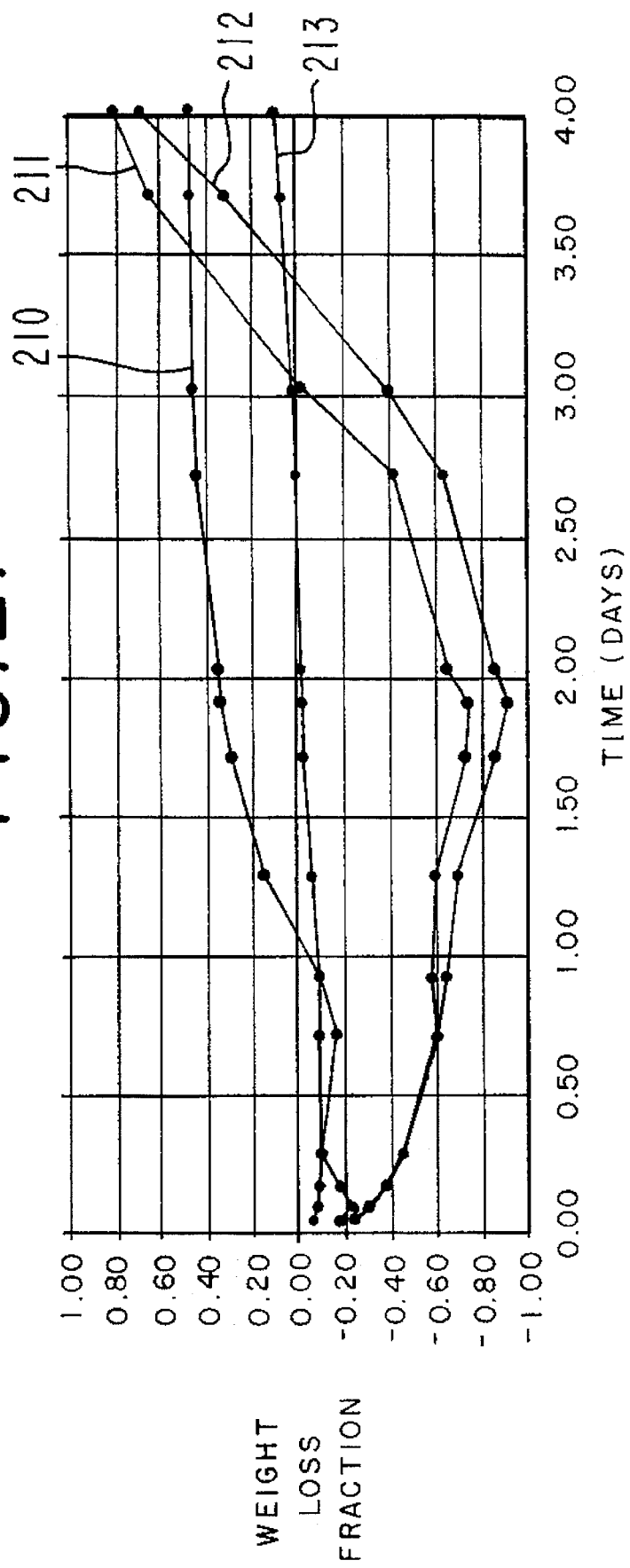
FIG. 21 is a graph showing weight loss fraction (on the "Y" axis) versus time (days) on the "X" axis for the accelerated weight loss for the product of Example XVII (containing VINEX® 2144 or VINEX® 2019 and, in two cases, containing GOHSEFIMER® 5407 versus the market product, TOILET DUCK®). The graph showing the TOILET DUCK® market article is indicated by reference numeral 213. The articles containing the VINEX® 2019 or VINEX® 2144 which may also contain the GOHSEFIMER® 5407 are set forth in detail in the detailed description of FIG. 21 and in the detailed description of Example XVII set forth, infra.

FIG. 21 is a graph for Example XVII showing weight loss fraction on the "Y" axis versus time (days) on the "X" axis for accelerated weight loss for the toilet rim block containing VINEX® 2144 or VINEX® 2019, silica, GOHSEFIMER® 5407, fragrance and Acid Blue No 9. The graph indicated by reference numeral 210 is for the toilet rim block containing the formulation containing 42% VINEX® 2019, 13% silica, 20% GOHSEFIMER® 5407, 20% fragrance and 5% Acid Blue No. 9. The graph indicated by reference numeral 211 is for the toilet rim block containing the formulation containing 42% VINEX® 2144, 13% silica, 20% GOHSEFIMER® 5407, 20% fragrance and 5% Acid Blue No. 9. The graph indicated by reference numeral 212 is for the toilet rim block containing the formulation containing 62% VINEX® 2144, 13% silica, no GOHSEFIMER® 5407, 20% fragrance and 5% Acid Blue No. 9. The graph indicated by reference numeral 213 is for the market product TOILET DUCK®.

Figure 22:
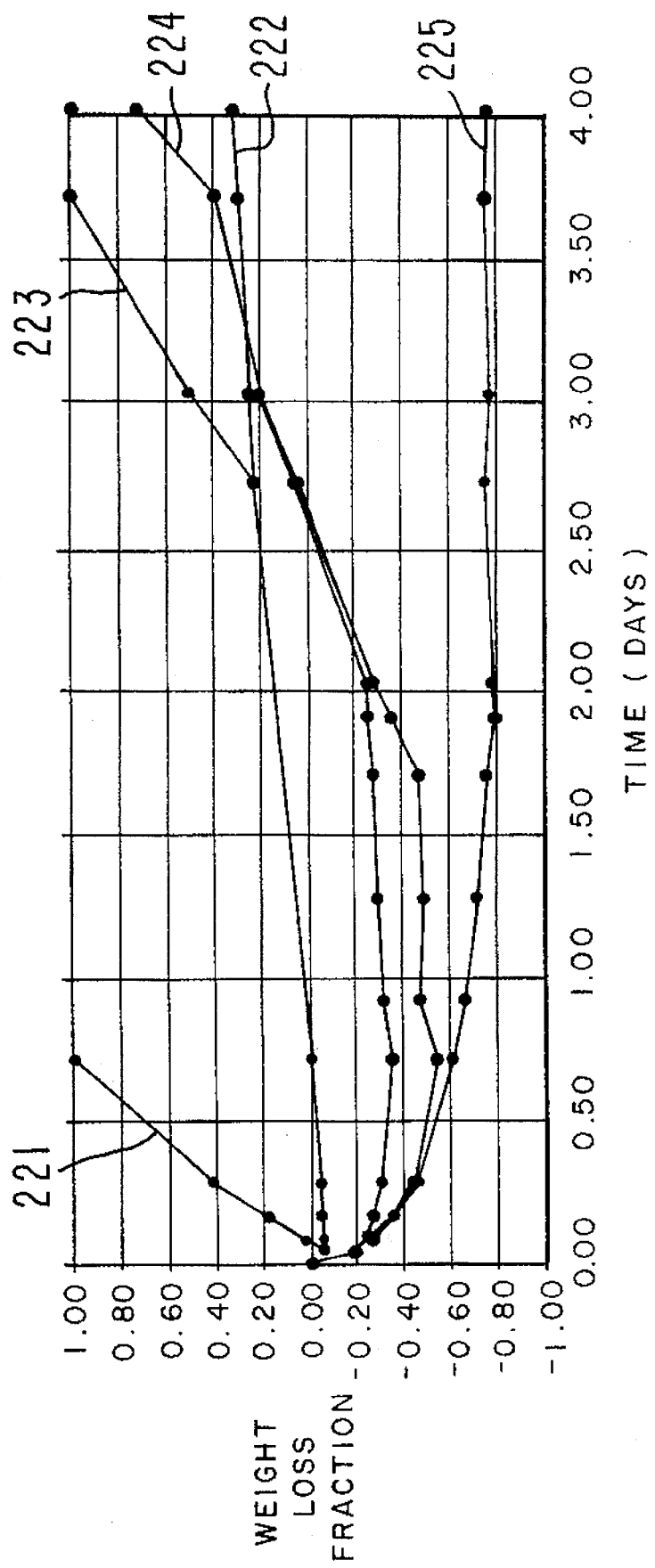
FIG. 22 is a graph showing weight loss fraction (on the "Y" axis) versus time (days) on the "X" axis for the accelerated weight loss of a toilet rim block containing blends of VINEX® 2019 and VINEX® 1025 together with silica, fragrance and Acid Blue Dye No. 9; VINEX® 2019, VINEX® 1025, silica, fragrance and Acid Blue Dye No. 9; VINEX® 2019; VINEX® 1025; silica; fragrance and Acid Blue Dye No. 9; and AIRVOL® 205; VINEX® 1025; silica; fragrance and Acid Blue Dye No. 9 versus the market product, TOILET DUCK®. The graph showing the market sample, TOILET DUCK® is indicated by reference numeral 222. The articles containing the AIRVOL® 205 or the VINEX® 2019 are set forth in detail in the detailed descriptions of Example XVIII, infra and in the detailed description of FIG. 22, infra.

FIG. 22 is a graph for Example XVIII showing weight loss fraction (on the "Y" axis) versus time (days) on the "X" axis for accelerated weight loss of toilet rim blocks containing VINEX® 2019 or AIRVOL® 205 and in addition, VINEX® 1025 (in two cases). The graph indicated by reference numeral 221 is for a rim block containing a formulation containing 62% VINEX® 2019, 13% silica, no VINEX® 1025, 20% fragrance and 5% Acid Blue No. 9. The graph indicated by reference numeral 222 is for the market product TOILET DUCK®. The graph indicated by reference numeral 222 is for a toilet rim block containing a formulation containing 62% AIRVOL® 205, 13% silica, no VINEX® 1025, 20% fragrance and 5% Acid Blue No. 9. The graph indicated by reference numeral 224 is for a toilet rim block containing a formulation containing 42% VINEX® 2019, 13% silica, 20% VINEX® 1025, 20% fragrance and 5% Acid Blue No. 9. The graph indicated by reference numeral 225 is for a toilet rim block containing a formulation containing 20% VINEX® 2019, 13% silica, 42% VINEX® 1025, 20% fragrance and 5% Acid Blue No. 9.

The following examples serve to illustrate embodiments of our invention as it is now preferred to practice it. It will be understood that these examples are illustrative and that the invention is to be restricted thereto only as defined in the appended claims.

EXAMPLE A

The following "compatible" rose fragrance formulation is used in carrying out Examples I–XXI, infra.

| Ingredient | Parts by Weight |
| --- | --- |
| Geraniol ex Palmarosa Oil | 0.5 |
| Nerol | 2.0 |
| L-Citronellol | 3.1 |
| D-Citronellol | 3.8 |
| Beta Phenyl Ethyl Alcohol | 2.0 |
| o-(2-hydroxy-1-ethyl)-methylbenzene | 4.0 |
| 5-phenyl-3-methyl-1-pentanol | 5.6 |

It should be noted that each of the ingredients of this example is a highly polar primary organic alcohol. Thus, preferably, the "compatible fragrances" of our invention are mixtures of highly polar primary organic alcohols.

EXAMPLE I

VINEX® 2144 is fed at 38 pounds per hour into a 30 mm Werner and Pfleiderer twin screw corotating twin screw extruder. The VINEX® 2144 (produced by Air Products & Chemicals, Inc. of Allentown, Pa.) is melted in the first stage of the screws and fragrance oil is then injected at 2 pounds per hour to yield 95% polyvinyl alcohol-5% fragrance. The melt exits the extruder as two strands are dropped onto a 20' long Sandvik water cooled belt (as illustrated in FIG. 7 described in detail, supra) to solidify the melt. The strands are then pelletized with a Conair pelletizer (as illustrated in FIG. 3 described in detail, supra) to solidify the melt. The strands are than pelletized with a Conair pelletizer (as illustrated in FIG. 3 described in detail, supra). The Summary of the Extrusion Conditions is set forth in the following Table I:

TABLE I

| | |
| --- | --- |
| RPM | 350 |
| % Torque | 45–60 |
| Rate (pph) | 40 |
| Melt Temperature (F.) | 219 |
| Set/Actual Barrel 1 Temperature (F.) | 190/190 |
| Set/Actual Barrel 2 Temperature (F.) | 200/200 |
| Set/Actual Barrel 3 Temperature (F.) | 210/210 |
| Set/Actual Barrel 4 Temperature (F.) | 210/209 |
| Set/Actual Barrel 5 Temperature (F.) | 210/210 |
| Set/Actual Die Temperature (F.) | 210/209 |
| Melt Pressure (psi) | 320 |

These pellets were extruded into 6" width-by-0.003" thick cast film with a 0.75" diameter Haake single screw extruder. Various molded shapes were made with a 40 ton Nissei injection molding machine. 3"×5"×0.125" cards were made on the injection molding machine with the following conditions:

TABLE II

| | |
| --- | --- |
| RPM | 250 |
| Secondary Pressure | 0.5 600 psi |
| Shot Size | 4.5 |
| Injection Speed | 21.0 |
| Rotation Speed | 34.0 |
| Nozzle Temperature (F.) | 380 |
| Front Temperature (F.) | 370 |
| Middle Temperature (F.) | 360 |
| Rear Temperature (F.) | 350 |
| Eject | 1.1 |
| Decompress | 0.2 |
| Cycle Start | 0.5 |
| Injection Time (seconds) | 12 |
| Curing Time (seconds) | 13 |
| Clamp Pressure | 2,000 psi |
| Pump Pressure | 2,000 psi |

EXAMPLE II

66% Fragrance is preabsorbed on a hydrophobic silica Degussa SIPERNAT® D17 in a NIRO AEROMATIC®MP1 Fluid Bed machine. A Brabender Prep Mixer is operated at 100 rpm and 190° C. to melt 187.6 grams of VINEX® 2025. 5.6 Grams of color is then added; 2.8 grams of surfactant is then added; then 84 grams of the above-silica-fragrance mixture is then added. The resulting melt is allowed to mix for one minute and then discharged into liquid nitrogen. The final composition was:

VINEX® 2025;

20% fragrance

10% Hydrophobic Silica D17;

2% color (Acid Blue No. 9); and

1% surfactant (TERGITOL® NP13).

The resulting compound is ground cold in a Cumberland Grinder with a 4 mm screen. The grind is then injection molded into a 0.75"×0.25"×4.375" bars on a Nissei 40 ton injection molding machine.

EXAMPLE III

50% Fragrance is absorbed on D17 silica with a fluid bed machine. A screw is designed with a long feed section containing deep SK elements, followed by a low shear melting zone; then a distributive mixing zone. VINEX® 2144 is fed at 8.4 pph and the fragrance silica mix is fed at 5.6 pph to yield a 60% polyvinyl alcohol:20% hydrophobic silica:20% fragrance compound. The two strands were cooled on the Sandvik water cooled belt (as illustrated in FIG. 7) and pelletized. The conditions of the extruder in this example are as follows:

TABLE III

| | |
|---|---|
| RPM | 192 |
| % Torque | 19 |
| Rate (pph) | 14 |
| Melt Temperature (F.) | 203 |
| Set/Actual Barrel 1 Temperature (F.) | 190/160 |
| Set/Actual Barrel 2 Temperature (F.) | 190/186 |
| Set/Actual Barrel 3 Temperature (F.) | 190/186 |
| Set/Actual Barrel 4 Temperature (F.) | 190/190 |
| Set/Actual Barrel 5 Temperature (F.) | 190/192 |
| Set/Actual Die Temperature (F.) | 190/193 |
| Melt Pressure (psi) | — |

Product was injection molded into 0.75"×0.25"×4.375" bars under the following conditions:

TABLE IV

| | |
|---|---|
| RPM | 150 |
| Secondary Pressure | 0.5 600 psi |
| Shot Size | 6.0 |
| Injection Speed | 31.0 |
| Rotation Speed | 24.0 |
| Nozzle Temperature (F.) | 380 |
| Front Temperature (F.) | 370 |
| Middle Temperature (F.) | 360 |
| Rear Temperature (F.) | 350 |
| Eject | 1.1 |
| Decompress | 0.2 |
| Cycle Start | 0.5 |
| Injection Time (seconds) | 12 |
| Curing Time (seconds) | 13 |
| Clamp Pressure | 2,000 psi |
| Pump Pressure | 2,000 psi |

EXAMPLE IV

An example identical to Example III was carried out with the exception that the formulation used was that of Example II.

EXAMPLE V

A product is produced by extrusion compounding 2% fragrance into VINEX® 2144 at 50 pph under similar conditions as Example III. Pellets were extrusion cast into 6" wide by 0.003" film with good properties. Using a Brabender/Haake ¾ extruder at 150 rpm with barrels set at 160°/210°/220°/220° C., the extruder was operated at steady state. The resulting film was slightly hazy.

EXAMPLE VI

Two rim block samples were prepared:

(a) Sample 2173—3:95% VINEX® 2144 and 5% rose fragrance; and (b) Sample 2173—4:85% VINEX® 2144—5% D17 silica— 10% rose fragrance.

Both rim blocks were prepared in a manner similar to that of Examples I–IV. The samples were injection molded into 0.75"×0.25"×4.375" bars. The bars were cut to maintain equal fragrance level with a market sample which is a GLORIX®* product. The products were inserted into standard rim block cages and put into toilets. The toilets were flushed 28 times over 24 hours. Intensity ratings were given by expert panelists and averaged into the Table V below:

Note *=Trademark of Unilever N.V. of Vlaardingen, Netherlands.

TABLE V

| | GLORIX ® | 2173-3 | 2173-4 |
|---|---|---|---|
| 8 Flushes | 3.8 | 4.3 | 4.1 |
| 10 Flushes | 4.2 | 4.1 | 4.1 |
| 28 Flushes | 3.2 | 4.2 | 4.0 |

The results of Table V are also set forth on FIG. 4.

EXAMPLE VII

A control rim block was prepared at 6% fragrance. The control is:

70% MARLON® A390 sodium dodecylbenzene sulfonate;

22% sodium sulphate;

2% ETHYLAN® LBC foam booster; and

6% fragrance.

A polyvinyl alcohol sample was prepared and was given No. 2183-2. The polyvinyl alcohol sample is as follows:

70% VINEX® 2144;

10% D17 silica; and

20% fragrance.

The sample was injection molded into 0.75"×0.25"× 4.375" bars. The bars were trimmed to maintain an equal fragrance weight to the control. The rim block intensity (on a scale of 1 to 5) is set forth in the following Table VI:

TABLE VI

| Days | Control-A | PVOH-A |
|---|---|---|
| 1 | 4.5 | 4.5 |
| 6 | 4.8 | 4.5 |
| 8 | 4.3 | 4.5 |
| 10 | 4.4 | 4.5 |
| 13 | 4.3 | 4.5 |
| 15 | 4.2 | 4.5 |
| 18 | 4 | 4.5 |
| 20 | 4 | 4.5 |
| 22 | 4 | 4.5 |
| 23 | 3.8 | 4.3 |
| 28 | 3.9 | 4.3 |
| 31 | 3.9 | 4.3 |
| 33 | 3.5 | 4.1 |
| 35 | 2.5 | 3.2 |

TABLE VI-continued

| Days | Control-A | PVOH-A |
|------|-----------|--------|
| 38   |           | 3.1    |

The results of Table VI are set forth on FIG. 5 described in detail, supra.

EXAMPLE VIII

An example substantially identical to that of Example VI was prepared with the exception that a different fragrance was used. The following results occurred:

TABLE VI

| Days | Control-A | PVOH-A |
|------|-----------|--------|
| 1    | 4         | 4.3    |
| 6    | 4.3       | 4      |
| 8    | 3.8       | 4      |
| 10   | 4         | 4      |
| 13   | 4.1       | 4.3    |
| 15   | 4         | 4.2    |
| 18   | 3.9       | 4.2    |
| 20   | 3.9       | 4.2    |
| 22   | 3.9       | 4.2    |
| 23   | 3.8       | 4.2    |
| 28   | 3.9       | 4.1    |
| 31   | 3.8       | 4.2    |
| 33   | 3.5       | 3.7    |
| 35   | 3         |        |
| 38   | 2         |        |

The results set forth in the foregoing table are also set forth in FIG. 6 described in detail, supra.

EXAMPLE IX

An example substantially identical to that of Example VI was carried out with the exception that the formulation is as follows:

48% VINEX® 2019;

10% D17 silica;

20% WITCONATE® 90;

20% fragrance as set forth in Example A; and

2% foam booster.

Furthermore, the final molded shape of the toilet rim block is 0.75"×0.25"×3.2" weighing 12 grams. The results are set forth in FIG. 12 and described in detail in the Detailed Description of the Drawings, supra.

EXAMPLE X

An example substantially identical to that of Example VI was carried out with the exception that the formulation used is as follows:

24% VINEX® 2019;

24% VINEX® 2144;

10% D17 silica;

20% WITCONATE® 90;

20% fragrance as set forth in Example A; and

2% foam booster.

The final molded shape was 0.75"×0.25"×3.2" weighing 12 grams.

EXAMPLE XI

An example substantially identical to that of Example VI was carried out with the exception that the formulation is as follows:

48% VINEX® 2144;

10% D17 silica;

20% WITCONATE® 90;

20% fragrance as set forth in Example A; and

2% foam booster.

The results are set forth in FIG. 14. The final molded shape of the toilet rim block was 0.75"×0.25"×3.2" weighing 12 grams.

EXAMPLE XII

An example substantially identical to that of Example VI was carried out with the exception that the formulation used is as follows:

50% VINEX® 2019;

10% D17 silica;

10% STANDAPOL® 7023; and

20% fragrance as set forth in Example A.

The final molded shape was 0.75"×0.25"×3.2" weighing 12 grams.

The sample gives no visible foaming.

EXAMPLE XIII

An example substantially identical to that of Example VI was carried out with the exception that different formulations were used as follows:

The formulation of the graph indicated by reference numeral 162 in FIG. 16:

46% VINEX® 2144;

10% D17 silica;

20% WITCONATE® 90;

20% fragrance as set forth in Example A; and

4% foam booster (the final molded shape: 0.75"×0.25"× 2.1" weighing 24 grams).

The formulation yielding the results as indicated in the graph indicated by reference numeral 160 in FIG. 16:

46% VINEX® 2144;

10% D17 silica;

20% WITCONATE® 90;

20% fragrance as set forth in Example A; and

2% foam booster.

The final molded shape for the rim block created from this formulation was 0.75"×0.25"×3.2" weighing 24 grams. The graph of FIG. 16 shows the effect of block size on dissolution rate.

EXAMPLE XIV

An example substantially identical to that of Example VI carried out with the exception that different formulations were used.

The formulation yielding results as set forth in the graph indicated by reference numeral 170 on FIG. 17 is as follows:

47% AIRVOL® 205;

10% D17 silica;

18% WITCONATE® 90;

5% STANDAPOL® 7023; and

20% fragrance as set forth in Example A, supra.
The final molded shape for the rim block for this formulation was 0.75"×0.25"×3.2" weighing 12 grams.

The formulation yielding the results indicated by the graph indicated by reference numeral 171 on FIG. 17 is as follows:

45% AIRVOL® 205;

10% D17 silica;

18% WITCONATE® 90;

5% STANDAPOL® 7023;

20% fragrance

2% foam booster.

The final molded shape of the rim block using this formulation was 0.75"×0.25"×3.2" weighing 12 grams.

FIG. 17 sets forth a comparison of the market products, GLORIX® and TOILET DUCK® versus the formulations set forth, supra.

EXAMPLE XV

An example substantially identical to that of Example VI was carried out with the exception that the formulations are as follows:

62% VINEX® 2144;

13% D17 silica;

varying quantities of WITCONATE® 90;

20% fragrance; and

5% Acid Blue No. 9.

The graph indicating the results obtained when using 20% WITCONATE® 90 on FIG. 19 is set forth by reference numeral 190. The formulation yielding the results indicated by the graph indicated by reference numeral 191 on FIG. 19 contains 15% WITCONATE® 90. The formulation yielding the results indicated by the graph indicated by reference numeral 192 set forth on FIG. 19 contains 10% WITCONATE® 90. The formulation yielding the results indicated by the graph indicated by reference numeral 194 on FIG. 19 contains 5% WITCONATE® 90. The formulation yielding the results indicated by the graph indicated by reference numeral 195 on FIG. 19 contains no WITCONATE® 90. The final molded shape of the rim block for each formulation was 0.75"×0.25"×3.2" weighing 12 grams each.

EXAMPLE XVI

An example substantially identical to that of Example VI was carried out with the exception that different formulations were used. The following results occurred.

The formulation yielding the results indicated by the graph indicated by reference numeral 201 on FIG. 20 contained:

62% VINEX® 2019;

13% D17 silica;

no GOHSEFIMER® LL02;

20% fragrance; and

5% Acid Blue No. 9.

The formulation yielding the results indicated by the graph indicated by reference numeral 202 on FIG. 20 contained:

42% VINEX® 2019;

13% D17 silica;

20% GOHSEFIMER® LL02;

20% fragrance; and

5% Acid Blue No. 9.

The formulation yielding the results indicated by the graph indicated by reference numeral 204 on FIG. 20 contained:

20% VINEX® 2019;

13% D17 silica;

42% GOHSEFIMER® LL02;

20% fragrance; and

5% Acid Blue No. 9.

The formulation yielding the results indicated by the graph indicated by reference numeral 203 on FIG. 20 is as follows:

42% VINEX® 2144;

13% D17 silica;

20% GOHSEFIMER® LL02;

20% fragrance; and

5% Acid Blue No. 9.

In each of the cases of the instant example, the final molded shape of the rim block containing each of the formulations was 0.75"×0.25"×3.2" weighing 12 grams.

EXAMPLE XVII

An example substantially identical to that of Example VI was carried out with the exception that different formulations were used. The following results were obtained:

The formulation yielding the results set forth in the graph indicated by reference numeral 210 on FIG. 21 is as follows:

42% VINEX® 2019;

13% D17 silica;

20% GOHSEFIMER® 5407;

20% fragrance as set forth in Example A, supra; and

5% Acid Blue No. 9.

The formulation yielding the results set forth in the graph indicated by reference numeral 211 on FIG. 21 is as follows:

42% VINEX® 2144;

13% D17 silica;

20% GOHSEFIMER® 5407;

20% fragrance as set forth in Example A, supra; and

5% Acid Blue No. 9.

The formulation yielding the results set forth in the graph indicated by reference numeral 212 on FIG. 21 is as follows:

62% VINEX® 2144;

13% D17 silica;

no GOHSEFIMER® 5407;

20% fragrance as set forth in Example A, supra; and

5% Acid Blue No. 9.

In each of the cases, the rim block had dimensions of 0.75"×0.25"×4.375" and weighed 17 grams. Each rim block was compared against the market product, TOILET DUCK®, supra, the results for which are set forth in the graph indicated by reference numeral 213 on FIG. 21.

EXAMPLE XVIII

An example substantially identical to that of Example VI was carried out with the exception that different formulations were used. The following results occurred:

The formulation yielding the results indicated by the graph indicated by reference numeral 221 on FIG. 22 is as follows:

62% VINEX® 2019;

13% D17 silica;

no VINEX® 1025;

20% fragrance as set forth in Example A, supra; and

5% Acid Blue No. 9.

The formulation yielding the results set forth in the graph indicated by reference numeral 223 on FIG. 22 is as follows:

62% AIRVOL® 205;

13% D17 silica;

no VINEX® 1025;

20% fragrance; and

5% Acid Blue No. 9.

The formulation yielding the results set forth in the graph indicated by reference numeral 224 on FIG. 22 is as follows:

42% VINEX® 2019;

13% D17 silica;

20% VINEX® 1025;

20% fragrance; as set forth in Example A, supra; and

5% Acid Blue No. 9.

The formulation yielding the results set forth in the graph indicated by reference numeral 225 on FIG. 22 is as follows:

20% VINEX® 2019;

13% D17 silica;

42% VINEX® 1025;

20% fragrance as indicated in Example A, supra; and

5% Acid Blue No. 9.

In each of the formulations, 0.25" thick bars were used having the dimensions of 0.75"×0.25"×4.375". Each of the bars weighed 17 grams. The formulations were compared against the market product, TOILET DUCK® the results for which are indicated by reference numeral 222 on FIG. 22.

EXAMPLE XIX

Using the procedure of Example VI, supra, the following bars having the dimensions of 0.75"×0.25"×4.375" and weighing 17 grams were produced containing different polyvinyl alcohol materials. Table VII set forth below shows the time required for the block to dissolve based on the particular polyvinyl alcohol in the formulation The formulation contained 62% polyvinyl alcohol, 13% D17 silica, fragrance (as set forth in Example A, supra) and 5% Acid Blue No. 9:

TABLE VII

| Polyvinyl Alcohol in Formulation | Time Required for Dissolution |
|---|---|
| AIRVOL ® 205 | 5 days |
| MOWIOL ® 1074 | 3 days |
| VINEX ® 2019:VINEX 2144, 1:2 (weight:weight ratio) | 5 days |
| MOWIOL ® 588 | 4 days |
| VINEX ® 2019 | 1 day |
| VINEX ® 2144 | no dissolution: loose swollen gel formed after 30 days |
| VINEX ® 1025 oil but did not contain fragrance | no dissolution |

EXAMPLE XX

An example substantially identical to that of Example VI was carried out with the exception that different formulations were used. The following results occurred:

The following formulation fell apart after 5 days with a major separation of ingredients:

42% VINEX® 2019;

13% D17 silica;

20% GOHSEFIMER® 5407;

20% fragrance; and

5% Acid Blue No. 9.

The following formulation had a life of 15 days and good fragrance delivery into the room with some separation noticed:

42% VINEX® 2144;

13% D17 silica;

20% GOHSEFIMER® 5407;

20% fragrance as set forth in Example A; and

5% Acid Blue No. 9.

The following formulation lasted 30 days with good color delivery but a low fragrance intensity yield. Excessive swelling caused the block to move in the flush tank set forth in FIGS. 10A, 10B and 10C:

59% VINEX® 2144;

13% D17 silica;

2.5% WITCONATE® 90;

20% fragrance; and

5% Acid Blue No. 9.

EXAMPLE XXI

An extruder set up similar to that set forth in FIG. 2-A is used in this example. The extruder is a 30 mm WIP extruder operating at 200 rpm and 19% torque, with the barrel segments at 120° C. except for barrel segment S10 which is at 125° C. The polymer used is GOHSEFIMER® LL02. The fragrance is a potpourri sachet fragrance. The ratio of GOHSEFIMER® LL02: fragrance is 4:1. The resulting melt temperature is 129° C.

When the torque is raised to 24%, the melt temperature of the product is 130° C.

The product is extruded into a polymeric tow. The tow is chopped up into particles and subsequently molded into bars.

The bars are useful as toilet rim blocks as set forth in FIG. 11.

What is claimed is:

1. A water-soluble or water-soluble composition of matter in the solid phase capable of emission of fragrance at a substantially constant intensity for a period of at least about 20 days consisting of:

(a) extruded polyvinyl alcohol or partially hydrolyzed polyvinyl acetate with the maximum mole ratio of acetyl moiety:hydroxyl moiety being about 3:1 having a number average molecular weight of from about 15,000 up to about 68,000 containing from about 2 up to about 13% by weight of polar plasticizer;

(b) from about 1 up to about 20% by weight of compatible fragrance admixed with the polyvinyl alcohol or partially hydrolyzed polyvinyl acetate;

(c) from 0 up to about 20% by weight of foaming agent admixed with the polyvinyl alcohol or partially hydrolyzed polyvinyl acetate;

(d) from 0 up to about 20% by weight of hydrophobic silica admixed with the polyvinyl alcohol or partially hydrolyzed polyvinyl acetate;

(e) from 0 up to about 20% by weight of at least one surfactant other than said foaming agent of (c);

(f) from 0 up to about 5% by weight of water soluble dye; and (g) from 0 up to about 4% by weight of foam booster with the proviso that if the content of said compatible fragrance is from 10% up to 20% by weight, then the composition contains hydrophobic silica with the hydrophobic silica:fragrance weight ratio being from about 1:1 up to about 1:2.

2. A toilet rim block molded using the composition of matter of claim 1.

3. The composition of matter of claim 1 containing from 1 up to 5% by weight of compatible fragrance and 0% silica.

4. A toilet rim block molded using the composition of matter of claim 3.

5. The composition of matter of claim 1 containing from about 5 up to about 20% by weight of compatible fragrance and from about 2.5 up to about 20% by weight of hydrophobic silica.

6. A toilet rim block molded using the composition of matter of claim 5.

7. The composition of matter of claim 5 wherein the ratio of hydrophobic silica:compatible fragrance varies from about 1:1 up to about 1:2.

8. A toilet rim block molded using the composition of matter of claim 7.

* * * * *